(12) United States Patent
Onodera et al.

(10) Patent No.: US 11,241,807 B2
(45) Date of Patent: Feb. 8, 2022

(54) MOLDED ARTICLE AND MANUFACTURING METHOD FOR SAME

(71) Applicant: KYORAKU CO., LTD., Kyoto (JP)

(72) Inventors: Masaaki Onodera, Kanagawa (JP); Naoya Kano, Tokyo (JP); Yoshitaka Matsubara, Tokyo (JP); Motoharu Fujii, Tokyo (JP)

(73) Assignee: KYORAKU CO., LTD., Kyoto (JP)

( * ) Notice: Subject to any disclaimer, the term of this patent is extended or adjusted under 35 U.S.C. 154(b) by 357 days.

(21) Appl. No.: 16/337,311

(22) PCT Filed: Sep. 28, 2017

(86) PCT No.: PCT/JP2017/035237
§ 371 (c)(1),
(2) Date: Mar. 27, 2019

(87) PCT Pub. No.: WO2018/062393
PCT Pub. Date: Apr. 5, 2018

(65) Prior Publication Data
US 2020/0031011 A1    Jan. 30, 2020

(30) Foreign Application Priority Data

Sep. 28, 2016 (JP) .............................. JP2016-189529
Sep. 30, 2016 (JP) .............................. JP2016-194550
(Continued)

(51) Int. Cl.
*B26F 1/00* (2006.01)
*B29C 44/02* (2006.01)
(Continued)

(52) U.S. Cl.
CPC ............ *B26F 1/0053* (2013.01); *B29C 44/02* (2013.01); *B29C 49/04* (2013.01); *B29C 49/4278* (2013.01);
(Continued)

(58) Field of Classification Search
None
See application file for complete search history.

(56) References Cited

U.S. PATENT DOCUMENTS

2013/0052377 A1* 2/2013 Tani .................... B29C 49/0005
428/34.1

FOREIGN PATENT DOCUMENTS

CN          1915642 A      2/2007
CN         102441985 A     5/2012
(Continued)

OTHER PUBLICATIONS

English Translation of JP 2009090472 (Year: 2009).*
(Continued)

*Primary Examiner* — Timothy Kennedy
*Assistant Examiner* — Olukorede Esan
(74) *Attorney, Agent, or Firm* — IP & T Group LLP

(57) ABSTRACT

The purpose of the present invention is to provide a molded article and a manufacturing method for a molded article by which it is possible to mitigate deformation of an opening. The present invention provides a molded article comprising a cylindrical base and an opening provided in the base, wherein a rib is provided adjacent to the opening. The present invention provides a manufacturing method for a molded article that includes a molded body formation step for forming a molded body having a cylindrical portion provided at one end thereof with an occlusion by molding a melted resin, and a cut-off step for cutting off the occlusion by cutting the cylindrical portion, wherein in the cut-off step, (Continued)

the cutting is performed in a state where a side wall of the cylindrical portion is warped in-plane by an external force.

13 Claims, 29 Drawing Sheets

(30) Foreign Application Priority Data

Apr. 7, 2017 (JP) .............................. JP2017-076802
Sep. 26, 2017 (JP) .............................. JP2017-184657

(51) Int. Cl.
*B29C 49/04* (2006.01)
*B29C 49/42* (2006.01)
*B29D 23/00* (2006.01)
*B29L 23/00* (2006.01)

(52) U.S. Cl.
CPC .... *B29C 2793/0018* (2013.01); *B29D 23/001* (2013.01); *B29L 2023/22* (2013.01)

(56) References Cited

FOREIGN PATENT DOCUMENTS

| CN | 102966822 B | 3/2015 |
|---|---|---|
| JP | 49-90095 | 2/1977 |
| JP | S52-8395 Y2 | 2/1977 |
| JP | 63-181683 | 11/1988 |
| JP | H04-23962 Y2 | 6/1992 |
| JP | 1994006027 U | 1/1994 |
| JP | H06-28537 U | 4/1994 |
| JP | 3219407 B2 | 10/2001 |
| JP | 2004-250055 | 9/2004 |
| JP | 2005-036474 | 2/2005 |
| JP | 2005-313427 | 11/2005 |
| JP | 2009-090472 | 4/2009 |
| JP | 3151025 | 6/2009 |
| JP | 2012-207837 | 10/2012 |
| JP | 2013-63639 | 4/2013 |
| JP | 2016-117835 A | 6/2016 |
| JP | 2016-120678 A | 7/2016 |
| JP | 2017-104992 A | 6/2017 |

OTHER PUBLICATIONS

Decision to grant a European patent of EP family application EP 3520993 issued by European Patent Office dated Oct. 8, 2020.
Notification to Grant Patent Right for Invention CN family application CN201780058732.8 dated Apr. 28, 2021.
Office Action of priority document of JP2016-189529 dated May 22, 2020.
Office Action of priority document of JP2016-194550 dated Jun. 10, 2020.
Office Action of priority document of JP2017-076802 dated Feb. 15, 2021.
Office Action of priority document of JP2017-184657 dated May 28, 2021.
The First Office Action issued by The State Intellectual Property Office of the People's Republic of China of CN family application CN201780058732.8 dated Oct. 10, 2020.
First search of CN family application CN2017800587328 dated Mar. 22, 2019.
Office Action issued by European Patent Office of EP family application No. 17856342.5 dated Sep. 26, 2019.

* cited by examiner

MOLDED ARTICLE AND MANUFACTURING METHOD FOR SAME

This application is a national stage application of PCT/JP2017/035237 filed on Sep. 28, 2017, which claims priority of Japan patent application number 2016-189529, 2016-194550, 2017-076802, and 2017-184657 filed on Sep. 28, 2016, Sep. 30, 2016, Apr. 7, 2017, and Sep. 26, 2017. The disclosure of each of the foregoing applications is incorporated herein by reference in its entirety.

TECHNICAL FIELD

The present application relates to a molded article and a manufacturing method for the same.

BACKGROUND ART

For example, in an air conditioner of an automobile or the like, a tube-shaped air-conditioning duct for circulating air is used.

As a method of manufacturing an air-conditioning duct, a blow molding method is widely known, in which a resin in a molten state is subjected to mold closing through a split mold, and made to expand by blowing air thereinto (see Patent Document 1).

PRIOR ART REFERENCE

Patent Document

Patent Document 1: Japanese Patent Publication No. 2012-207837

SUMMARY

Problems to be Solved by the Invention

In the blow molding, when an opening portion is to be formed in a molded body, in general, the opening portion is formed by forming a part called a disposal bag which is constituted by providing a closure portion at one end of a tubular portion, and cutting to remove the closure portion. In general, residual stress is present in the tubular portion constituting the disposal bag, and the balance of the residual stress is maintained in a state in which the closure portion is provided, so that the shape of the disposal bag is maintained. Therefore, if the closure portion is cut off (removed by cutting), sometimes, the opening portion may be deformed in a narrowed manner, or the cut end of the tubular portion may be deformed in a direction perpendicular to the opening surface, due to the fact that the balance of the residual stress is broken. If the opening portion is deformed, problems such as poor joining with other members may occur.

The present application has been made in view of such circumstances, and provides a molded article capable of suppressing deformation of an opening portion.

Means for Solving the Problems

According to the present application, there is provided a molded article, comprising a tubular base portion and an opening portion disposed in the base portion, wherein a rib is disposed at a position adjacent to the opening portion.

In the molded article of the present application, a rib is disposed at a position adjacent to a peripheral edge of the opening portion, and the peripheral edge is reinforced by the rib, therefore deformation of the opening portion is suppressed.

Hereinafter, various embodiments of the present application will be exemplified. The embodiments shown below can be combined with each other. Preferably, the rib is disposed between a parting line of the molded article and the opening portion. Preferably, when a distance between the parting line of the molded article and the opening portion is set to be L1 and a length of a side wall of the rib is set to be L2, L2/L1 is 0.5 or more. Preferably, the side wall of the rib is disposed to be connected to the parting line. Preferably, the rib is disposed such that its depth increases as it extends away from the opening portion. Preferably, when a depth of the deepest portion of the rib is set to be D and a thickness of a bottom wall of the rib is set to be T, D/T is 2 or more. Preferably, the molded article comprises a beam rib disposed along a peripheral edge of the opening portion, and the beam rib is disposed between the parting line of the molded article and the opening portion. Preferably, the rib is disposed to be connected to the beam rib. Preferably, a plurality of the ribs are disposed to be connected to the beam rib. Preferably, the beam rib is constituted by a groove-shaped concave portion disposed along the peripheral edge. Preferably, the rib is disposed within the groove-shaped concave portion. Preferably, a peripheral edge of the opening portion has a pair of long-side portions opposite to each other and a pair of short-side portions disposed to be connected to the pair of long-side portions. Preferably, the rib is disposed at a center of the long-side portion. Preferably, the molded article is a foamed molded article. According to another aspect of the present application, there is provided a method of manufacturing a molded article, comprising a molded body formation step and a cut-off step, wherein in the molded body formation step, a molded body is formed by molding a molten resin, wherein the molded body comprises a tubular base portion, a tubular portion disposed to be erected from the base portion, and a rib located at a position adjacent to the tubular portion, a closure portion is disposed at one end of the tubular portion, and in the cut-off step, the closure portion is removed by cutting the tubular portion to form an opening portion.

Furthermore, according to the present application, there is provided a method of manufacturing a molded article, comprising: a molded body formation step of forming a molded body by molding a molten resin, the molded body having a tubular portion which has one end provided with a closure portion; and a cut-off step of cutting off the closure portion by cutting the tubular portion, wherein in the cut-off step, the cutting is performed in a state in which a side wall of the tubular portion, in a plane, is warped by an external force.

If the closure portion is cut off without warping the side wall of the tubular portion in a plane, there is a case where a force enabling the side wall of the tubular portion to be warped in a plane is applied to the side wall of the tubular portion due to residual stress which is present on the side wall of the tubular portion due to the cross-sectional shape of the tubular portion. On the other hand, if the side wall of the tubular portion, in a plane, is warped by an external force, a restoring force in the in-plane direction is generated on the side wall of the tubular portion. Therefore, if the closure portion is cut off in a state in which the side wall of the tubular portion, in a plane, is warped by an external force so as to generate a restoring force counteracting the residual stress, the residual stress and the restoring force counteract each other such that the deformation of the cut end of the tubular portion is suppressed.

Hereinafter, various embodiments of the present application will be exemplified. The embodiments shown below can be combined with each other. Preferably, the side wall of the tubular portion has a cross-sectional shape including a pair of corner portions, and in the cut-off step, the side wall of the tubular portion is warped in a plane in such a manner that a center of the pair of corner portions is made to face a direction away from the closure portion. Preferably, the side wall of the tubular portion has a pair of long-side portions opposite to each other and a pair of short-side portions disposed to be connected with the pair of long-side portions, and in the cut-off step, the long-side portion is warped in the plane in such a manner that a center of the long-side portion is made to face a direction away from the closure portion. Preferably, the molded body comprises a base portion, and the tubular portion is disposed in such a manner as to be erected from the base portion. Preferably, the base portion has a peripheral edge portion disposed at a peripheral edge of the tubular portion and an adjacent wall disposed adjacent to the peripheral edge portion, wherein the adjacent wall has an angle of 75 degrees or less with respect to the peripheral edge portion. Preferably, in the cut-off step, the side wall of the tubular portion, in a plane, is warped by pressing the base portion. Preferably, the base portion has a peripheral edge portion provided at a peripheral edge of the tubular portion, the peripheral edge portion is bent so as to bulge in a direction in which the tubular portion is erected, and in the cut-off step, the side wall of the tubular portion, in a plane, is warped by pressing the peripheral edge portion. Preferably, the cut-off step includes a step of disposing the molded body in a cutting jig and cutting off the closure portion in this state, wherein the cutting jig has a jig opening portion capable of accommodating the tubular portion, the molded body is disposed such that the tubular portion is accommodated in the jig opening portion and the peripheral edge portion abuts against the cutting jig, and the closure portion is removed by cutting, in a state in which the peripheral edge portion is deformed by being pressed against the cutting jig. Preferably, in the cut-off step, the molded body is cut linearly. Preferably, the molded body is formed by blow molding. Preferably, the molten resin contains a foaming agent, and the molded body is a foamed molded body.

Figure 10:
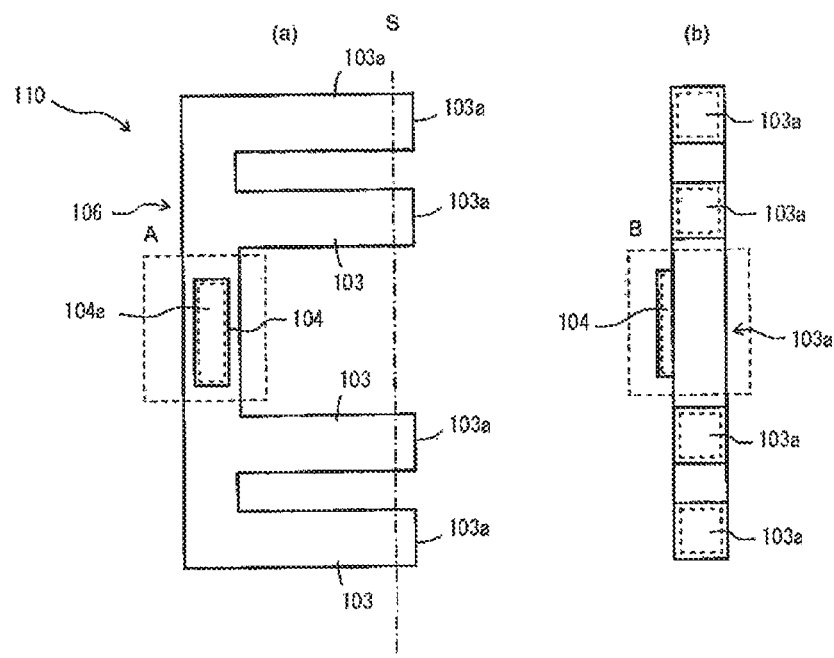
FIG. 10 shows a molded body 110 for manufacturing an air-conditioning duct, (a) in FIG. 10 is a plan view when viewed from the side where a tubular portion 104 is located, and (b) in FIG. 10 is a right side view.
Figure 11:
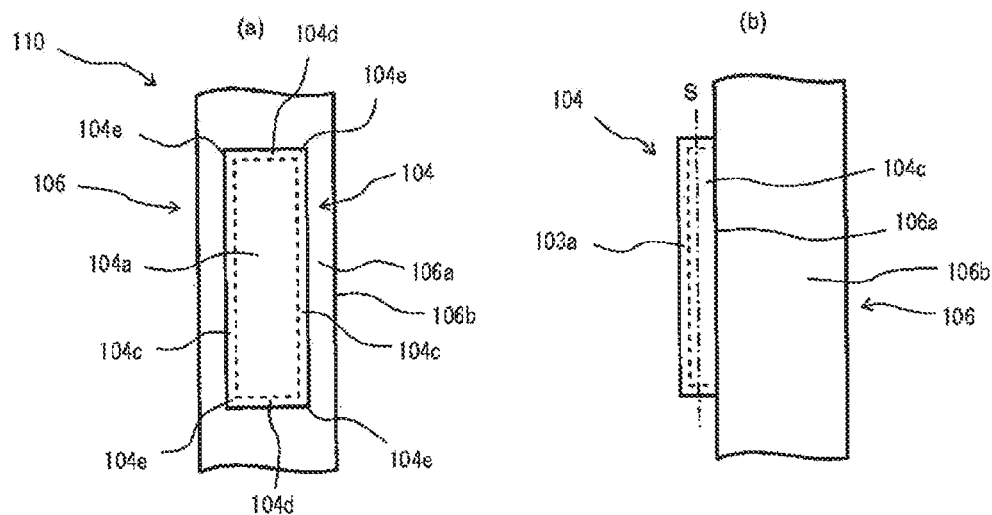

(a) in FIG. 11 is an enlarged view of a region A in (a) of FIG. 10, and (b) in FIG. 11 is an enlarged view of a region B in (b) of FIG. 10.

Figure 12:
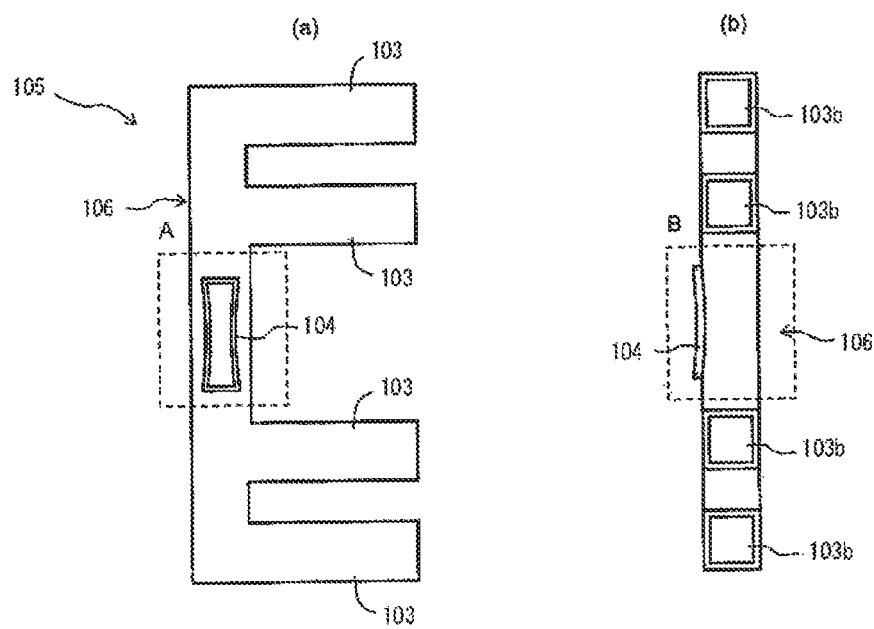

FIG. 12 shows a molded article 105 obtained by removing closure portions 103a and 104a from the molded body 110 of FIG. 10, (a) in FIG. 12 is a plan view when viewed from the side where the tubular portion 104 is located, and (b) in FIG. 12 is a right side view.

Figure 13:
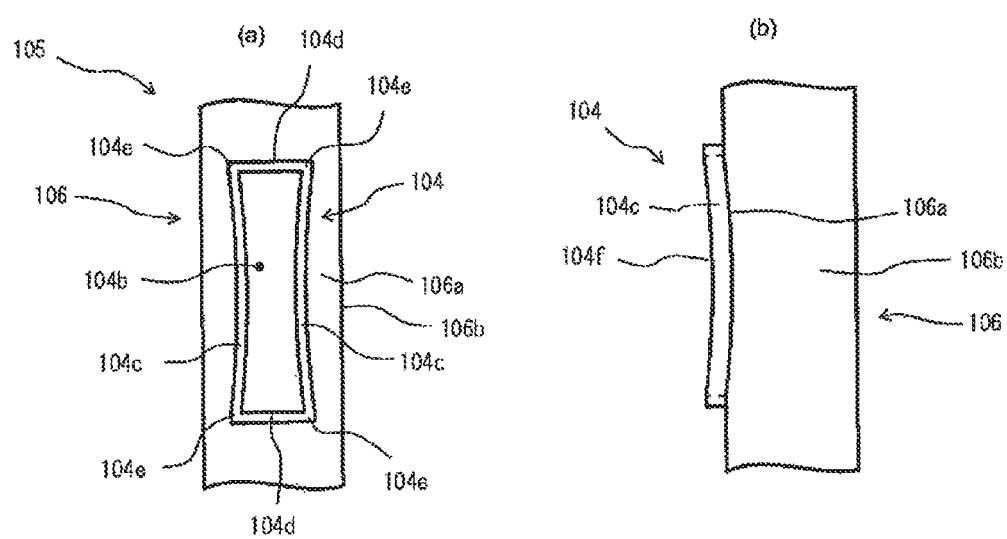

(a) in FIG. 13 is an enlarged view of a region A in (a) of FIG. 12, and (b) in FIG. 13 is an enlarged view of a region B in (b) of FIG. 12.

Figure 14:
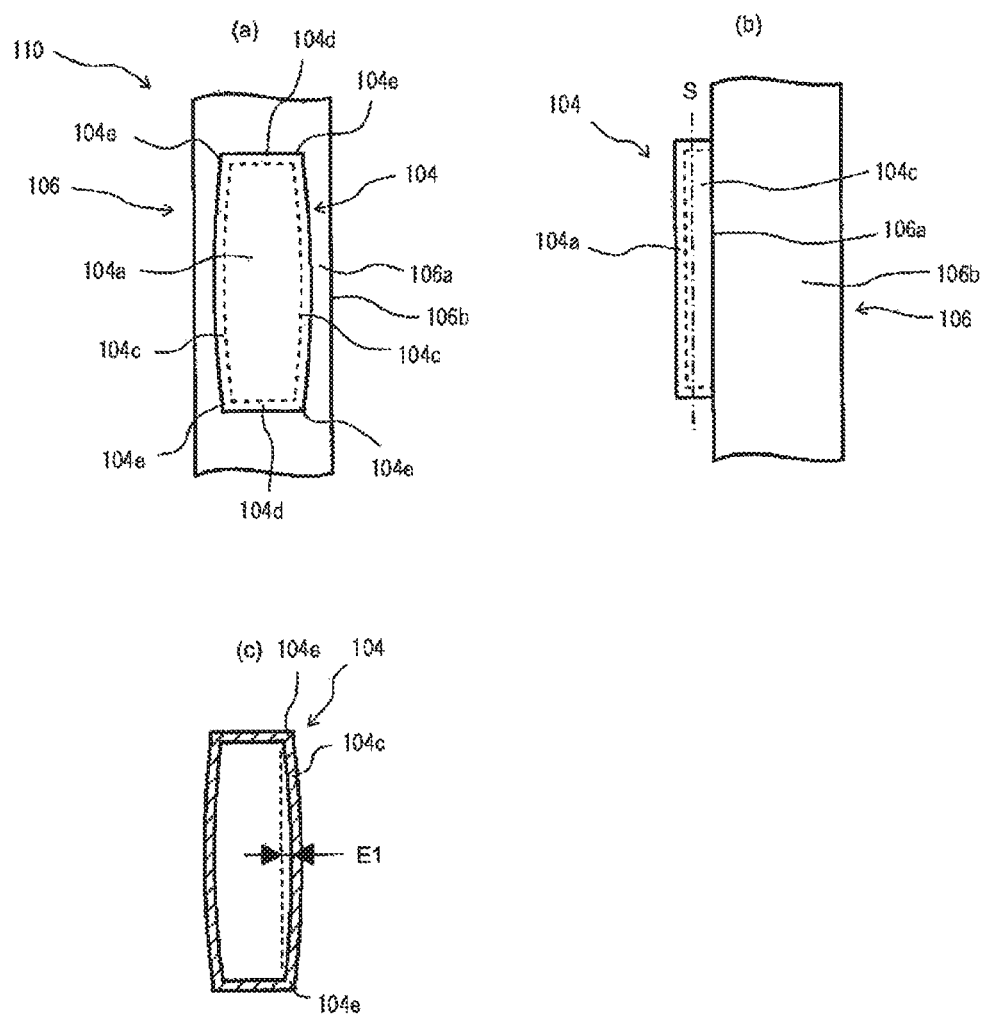

FIG. 14 shows a molded body 110 in a state in which a long-side portion 104c is bent in a direction in which the center of the long-side portion 104c of the tubular portion 104 is away from an opening portion 104b, (a) and (b) in FIG. 14 are enlarged views of parts respectively corresponding to the region A of (a) in FIG. 10 and the region B of (b) in FIG. 10, and (c) in FIG. 14 is an end view along a cutting line S in (b) of FIG. 14.

Figure 15:
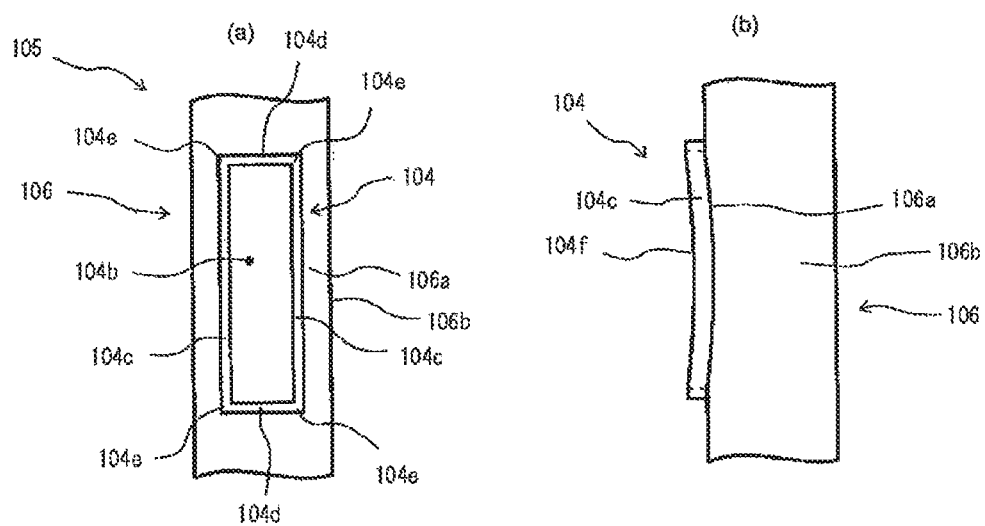

FIG. 15 shows a molded article 105 obtained by removing a closure portion 104a from the molded body 110 of FIG. 14, (a) and (b) in FIG. 15 are enlarged views of parts corresponding to the region A of (a) in FIG. 11 and the region B of (b) in FIG. 11, respectively.

Figure 16:
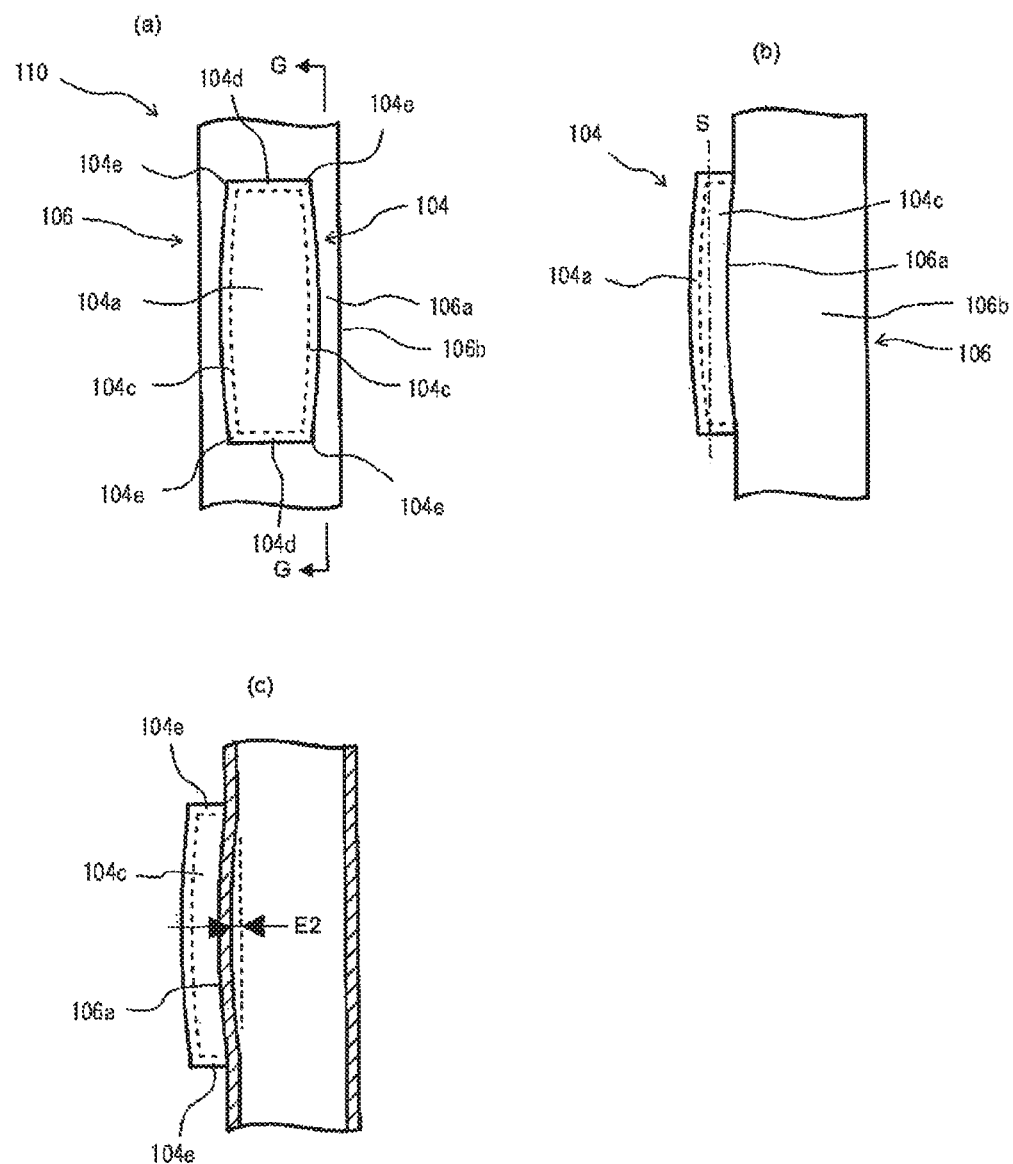

FIG. 16 shows a molded body 110 formed such that a closure portion 104a and a peripheral edge portion 106a are bent to bulge in a direction in which the tubular portion 104 is erected, (a) and (b) in FIG. 16 are enlarged views of parts respectively corresponding to the region A of (a) in FIG. 10 and the region B of (b) in FIG. 10, and (c) in FIG. 16 is a G-G sectional view of (a) in FIG. 16.

Figure 17:
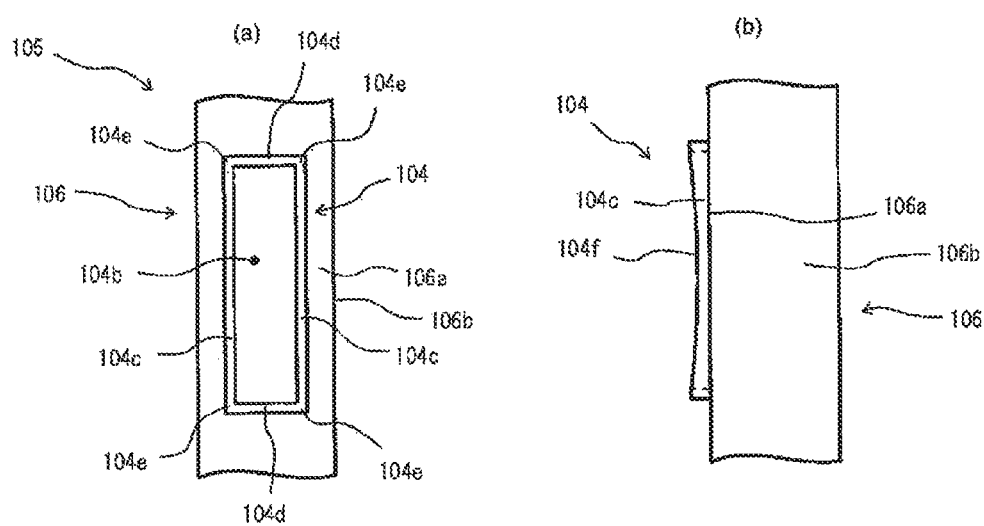

FIG. 17 shows a molded article 105 obtained by removing the closure portion 104a from the molded body 110 of FIG. 16, and (a) and (b) in FIG. 17 are enlarged views of parts corresponding to the region A of (a) in FIG. 11 and the region B of (b) in FIG. 11, respectively.

Figure 18:
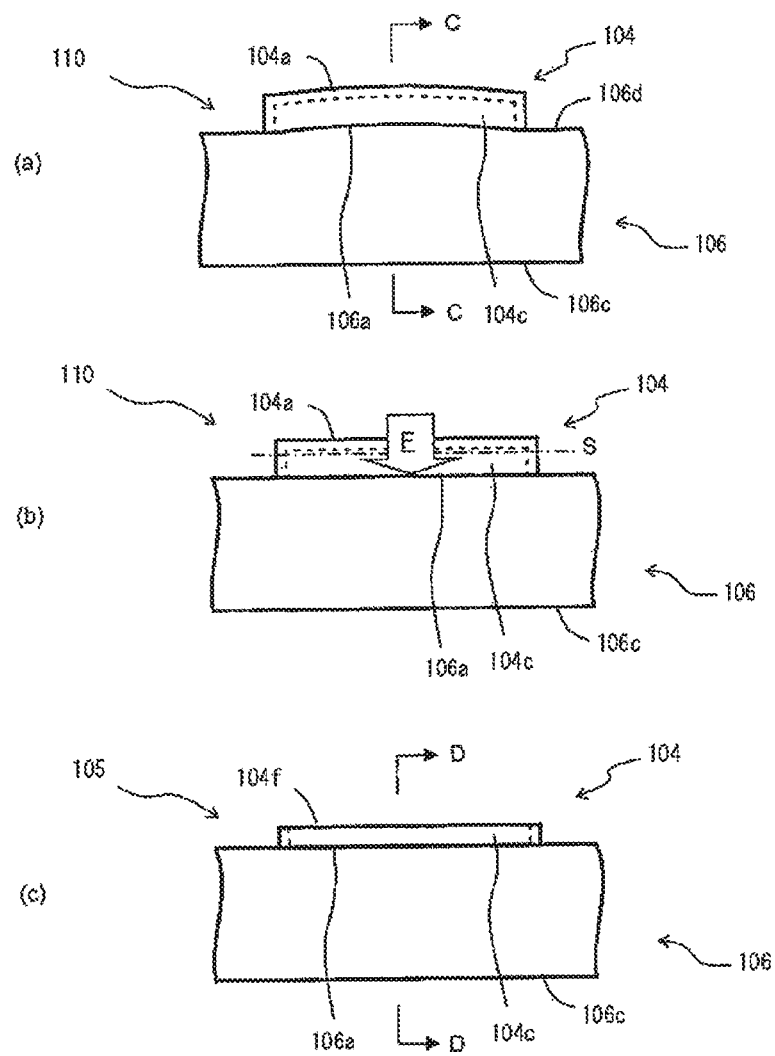

(a) to (c) in FIG. 18 are right side views showing a step of pressing the peripheral edge portion 106a by an external force F and cutting the tubular portion 104.

Figure 19:
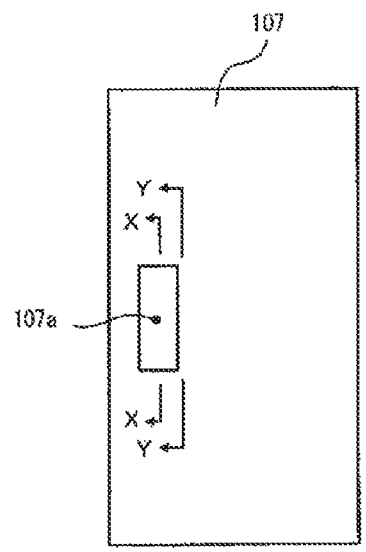

FIG. 19 is a plan view of a cutting jig 107.

Figure 20:
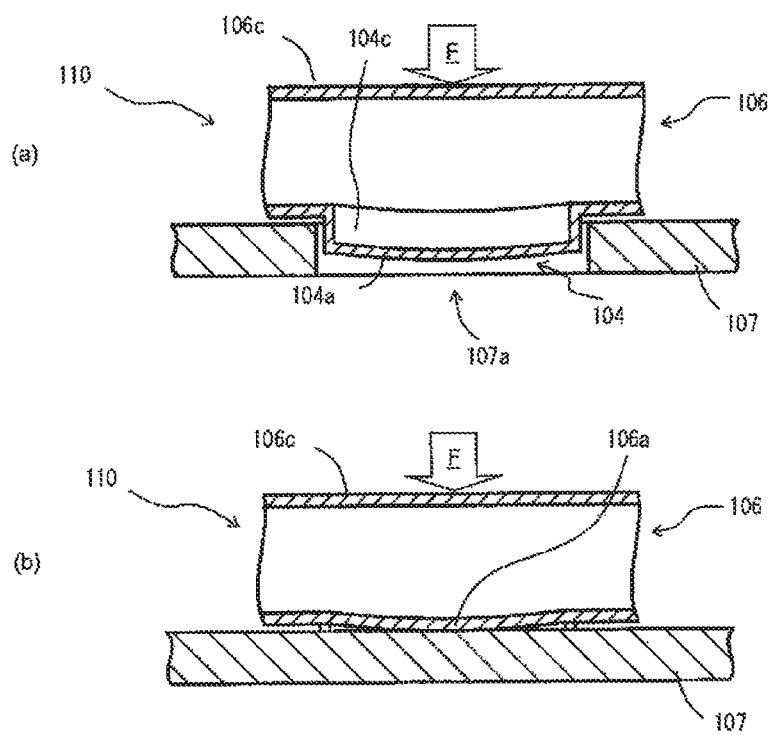

FIG. 20 shows a state in which the molded body 110 is disposed on the cutting jig 107, and (a) and (b) in FIG. 20 are sectional views corresponding to the X-X section and the Y-Y section in FIG. 19, respectively.

Figure 21:
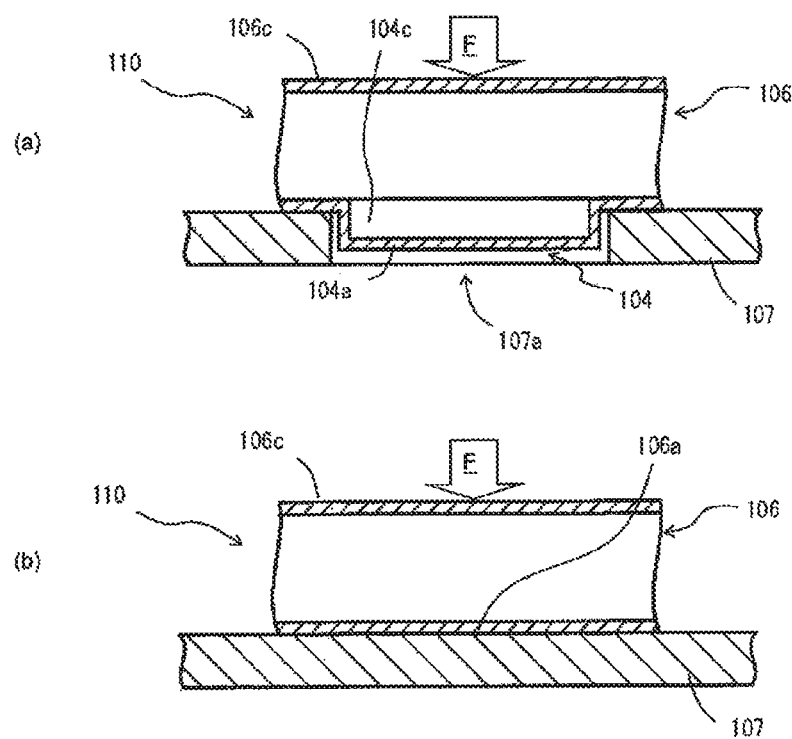

FIG. 21 shows a state in which the peripheral edge portion 106a is pressed to abut against the cutting jig 107 by an external force F from the state of FIG. 20, and (a) and (b) in FIG. 21 are sectional views corresponding to the X-X section and the Y-Y section in FIG. 19, respectively.

Figure 22:
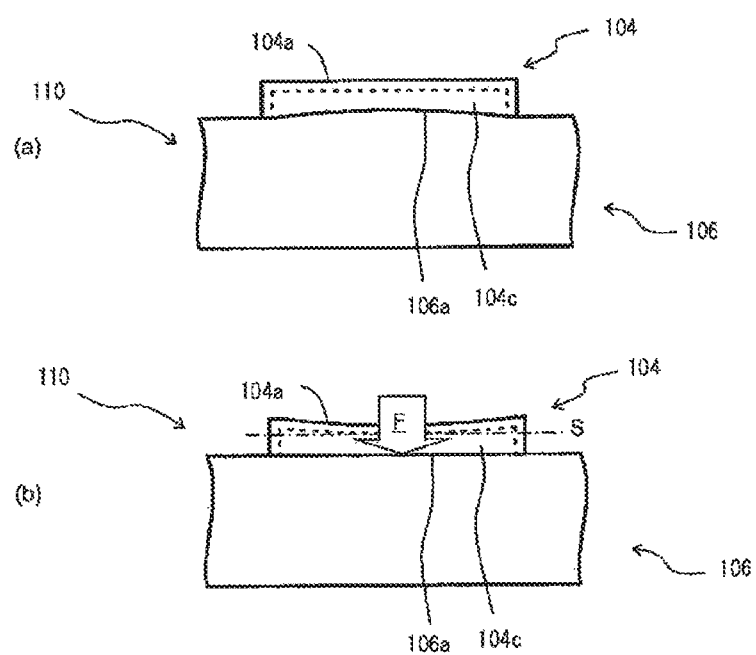

(a) and (b) in FIG. 22 are right side views showing a molded body 110, with the molded body 110 being formed such that the closure portion 104a is flat and the peripheral edge portion 106a is bent to bulge in the direction in which the tubular portion 104 is erected, (a) in FIG. 22 shows a state before an external force F is applied, and (b) in FIG. 22 shows a state in which the external force F is applied to the peripheral edge portion 106a.

Figure 23:
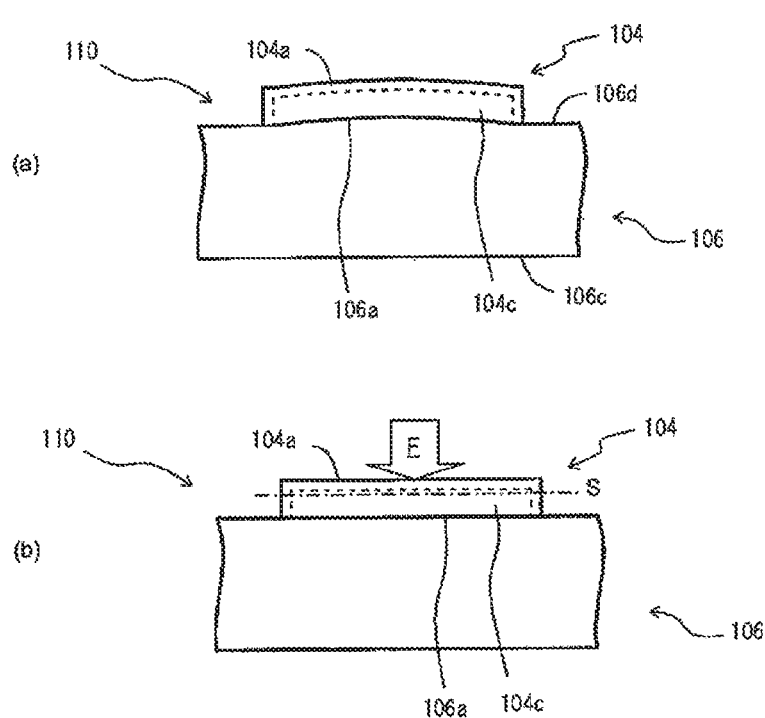

(a) and (b) in FIG. 23 are right side views showing a molded body 110, with the molded body 110 being formed such that the closure portion 104a and the peripheral edge portion 106a are bent to bulge in the direction in which the tubular portion 104 is erected, (a) in FIG. 23 shows a state before an external force F is applied, and (b) in FIG. 23 shows a state in which the external force F is applied to the closure portion 106a.

Figure 24:
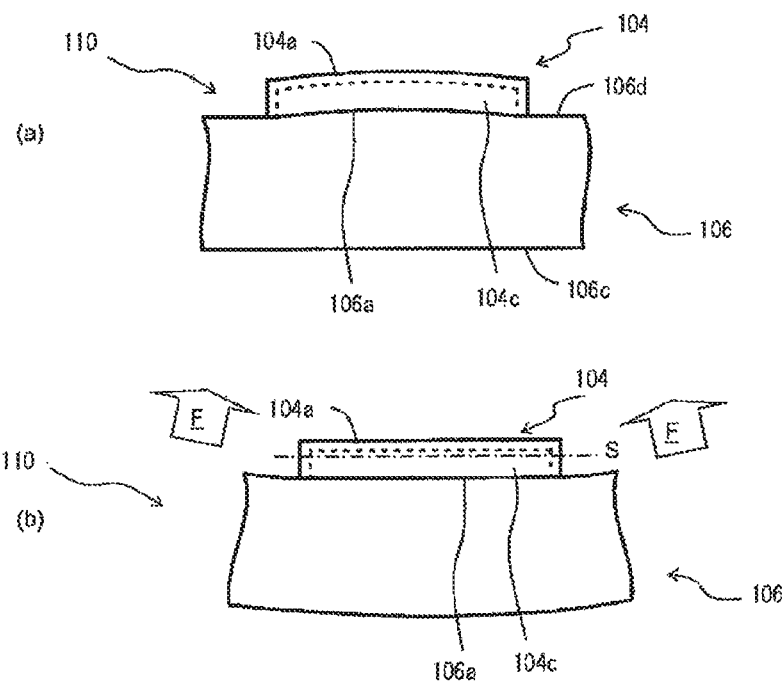

(a) and (b) in FIG. 24 are right side views showing a molded body 110, with the molded body 110 being formed such that the closure portion 104a and the peripheral edge portion 106a are bent to bulge in the direction in which the tubular portion 104 is erected, (a) in FIG. 24 shows a state before an external force F is applied, and (b) in FIG. 24 shows a state in which the external force F is applied in such a manner that the entire molded body 110 is bent.

Figure 25:
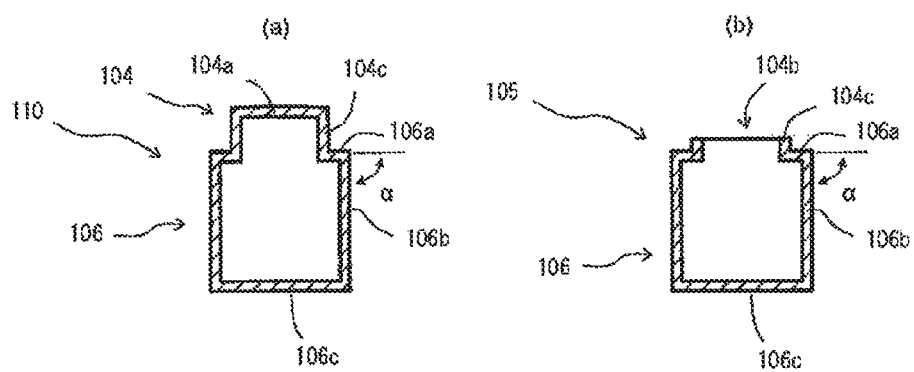

(a) in FIG. 25 is a C-C sectional view of (a) in FIG. 18, and (b) in FIG. 25 is a D-D sectional view of (c) in FIG. 18.

Figure 26:
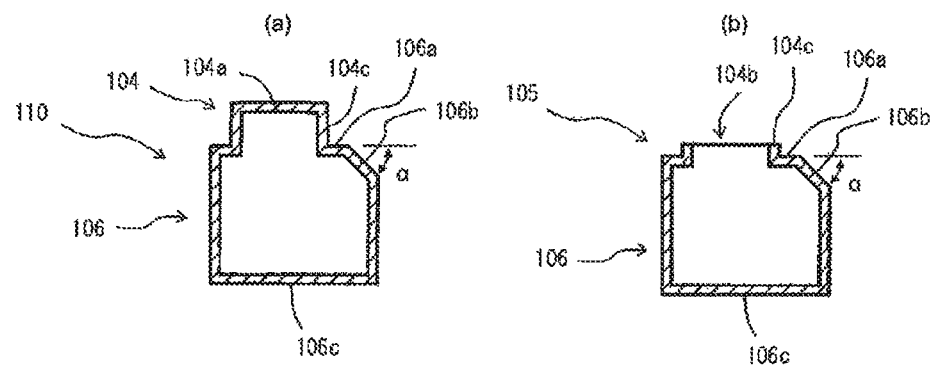

(a) and (b) in FIG. 26 respectively show a molded body 110 and a molded article 105 in which an adjacent wall 106b has an angle of 75 degrees or less with respect to the peripheral edge portion 106a, and (a) and (b) in FIG. 26 are sectional views corresponding to (a) and (b) in FIG. 25, respectively.

Figure 27:
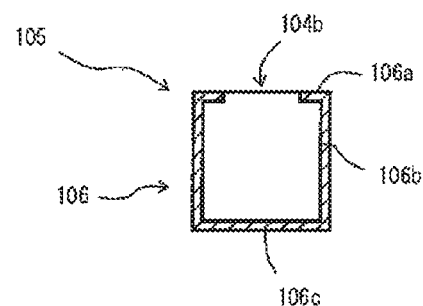

FIG. 27 is a sectional view corresponding to (b) in FIG. 25, showing a molded article 105 formed by cutting off the entire tubular portion 104.

Figure 28:
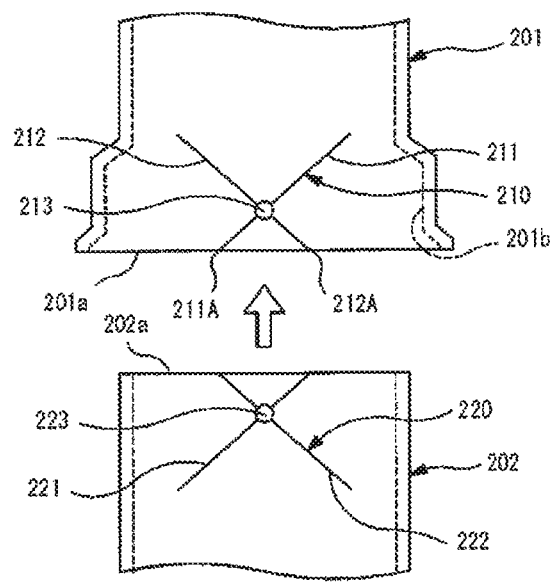

FIG. 28 is a schematic plan view showing a state before ducts are connected.

Figure 29:
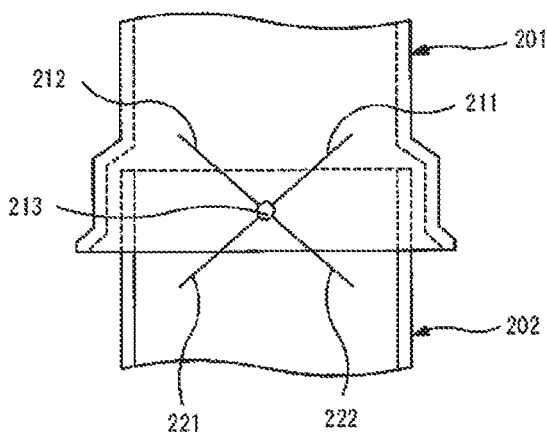

FIG. 29 is a schematic plan view showing a state after the ducts are connected.

Figure 30:
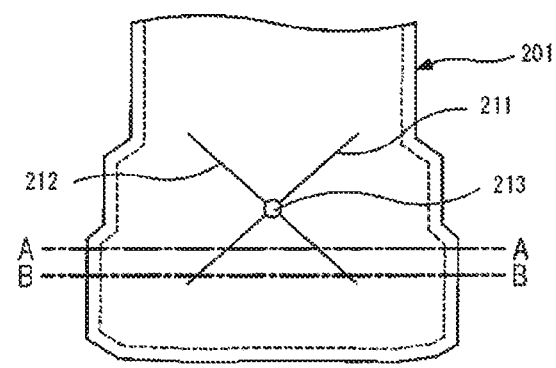

FIG. 30 is a schematic plan view for illustrating a position at which the duct is to be cut.

Figure 31:
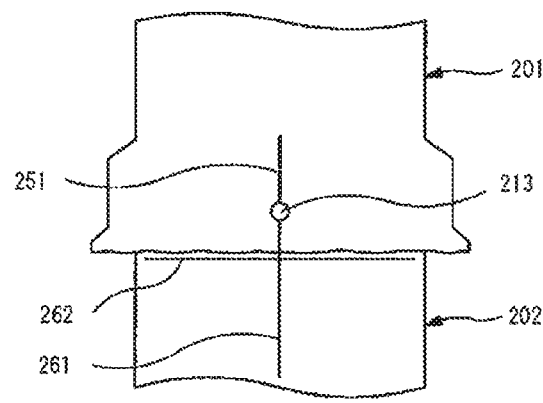

FIG. 31 is a schematic plan view in a case where the direction of a positioning mark coincides with an insertion direction.

Figure 32:
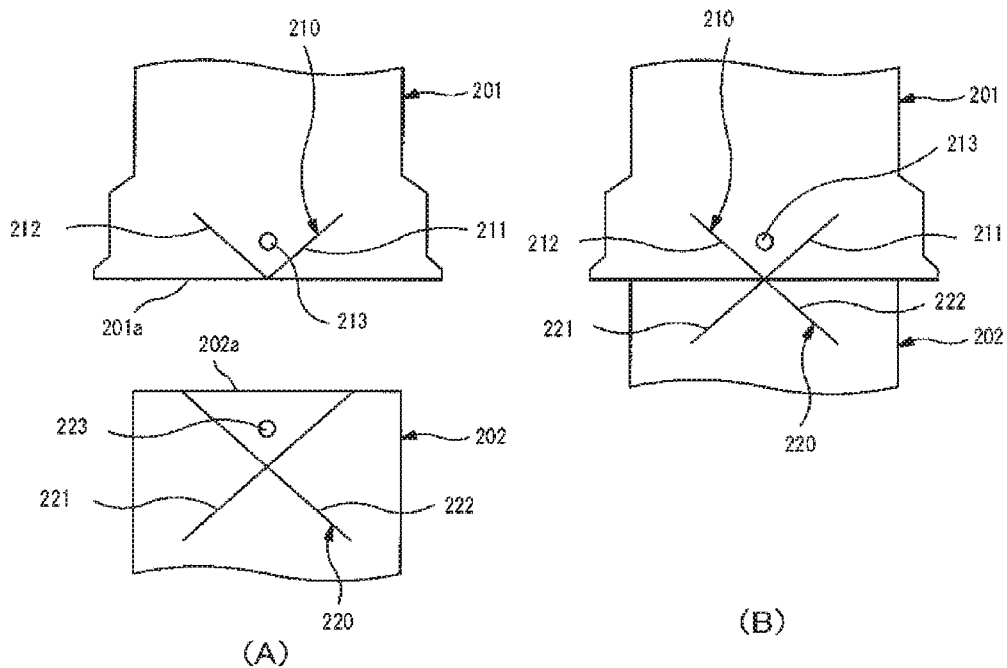

FIG. 32 is a schematic plan view showing another example of the positioning mark, (A) in FIG. 32 shows a view prior to insertion, and (B) in FIG. 32 shows a view after insertion.

Figure 33:
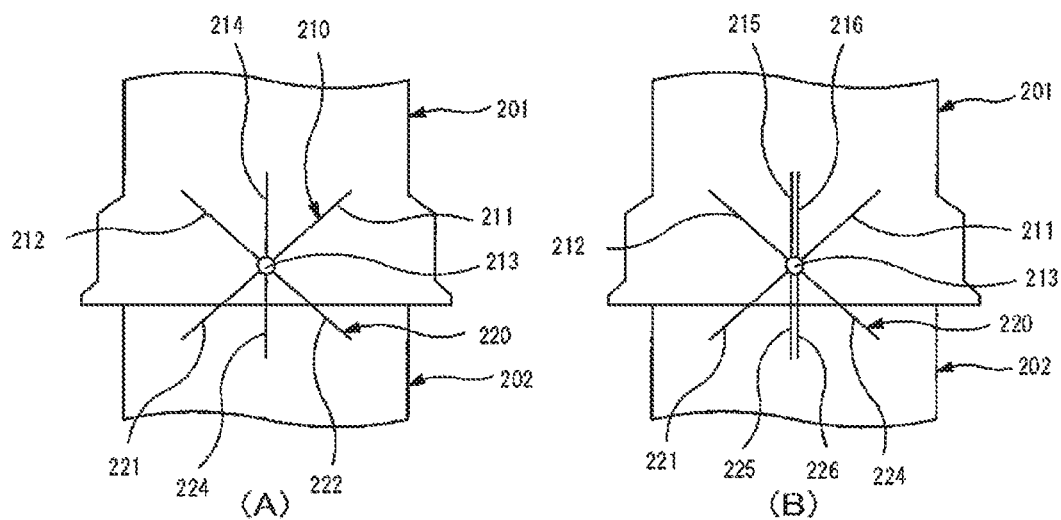

FIG. 33 is a view showing a state in which the positioning marks are formed on both front and back surfaces, (A) in FIG. 33 is a schematic plan view of the front surface, and (B) in FIG. 33 is a schematic plan view of the back surface.

Figure 34:
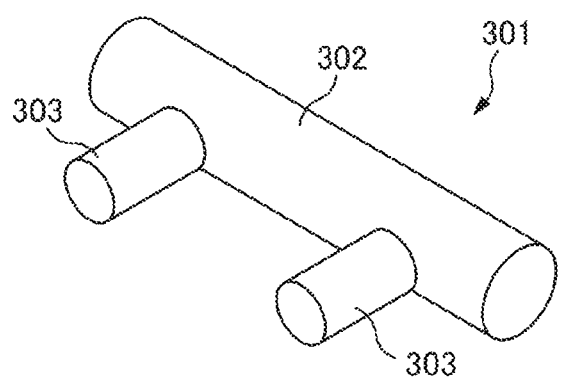

FIG. 34 is a schematic perspective view showing an example of a foamed duct.

Figure 35:
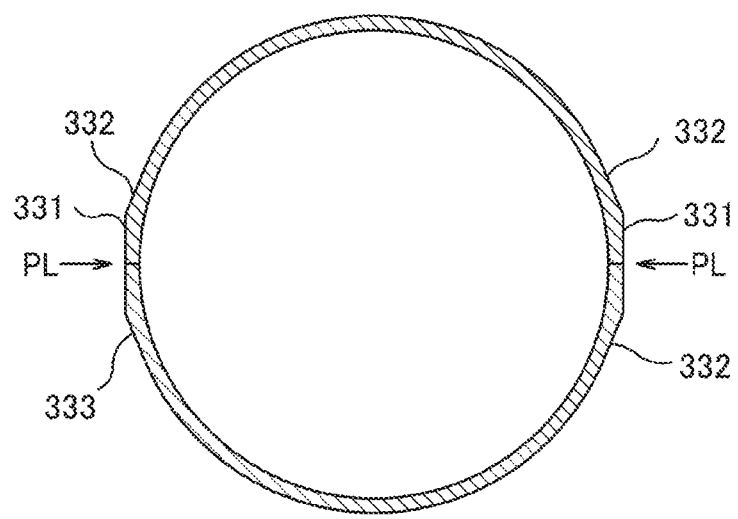

FIG. 35 is a view showing an example of a cross-sectional shape of a foamed duct.

Figure 36:
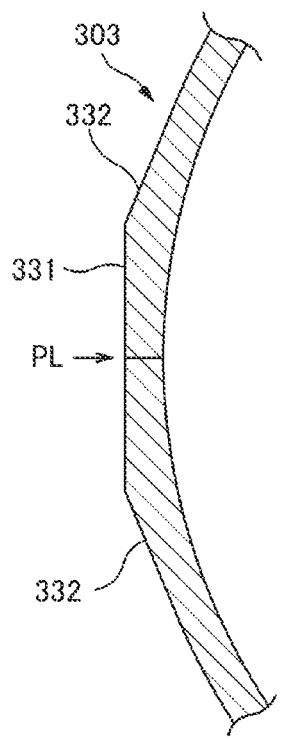

FIG. 36 is a view showing the vicinity of a parting line of the foamed duct of FIG. 34 in an enlarged manner.

Figure 37:
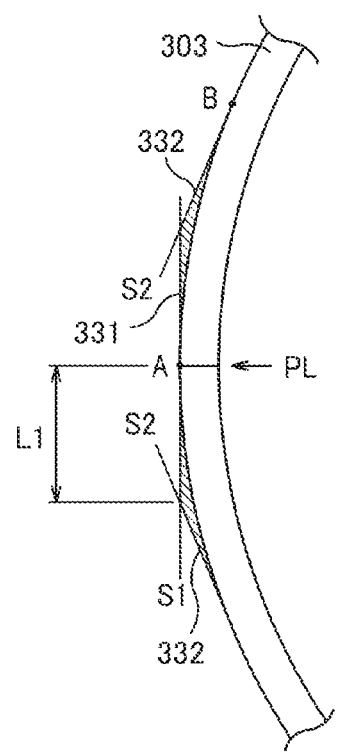

FIG. 37 is a view for illustrating a cross-sectional shape of the foamed duct shown in FIGS. 34 and 35.

Figure 38:
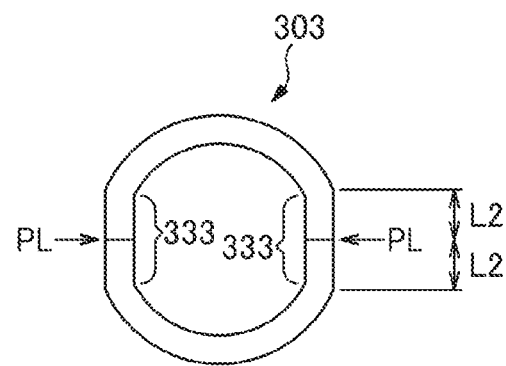

FIG. 38 is a view schematically showing another example of the cross-sectional shape of the foamed duct.

Figure 39:
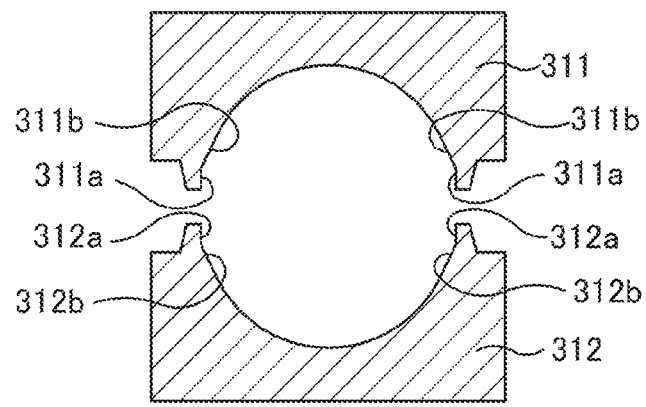

FIG. 39 is a view showing an example of a metal mold for molding a foamed duct.

Figure 40:
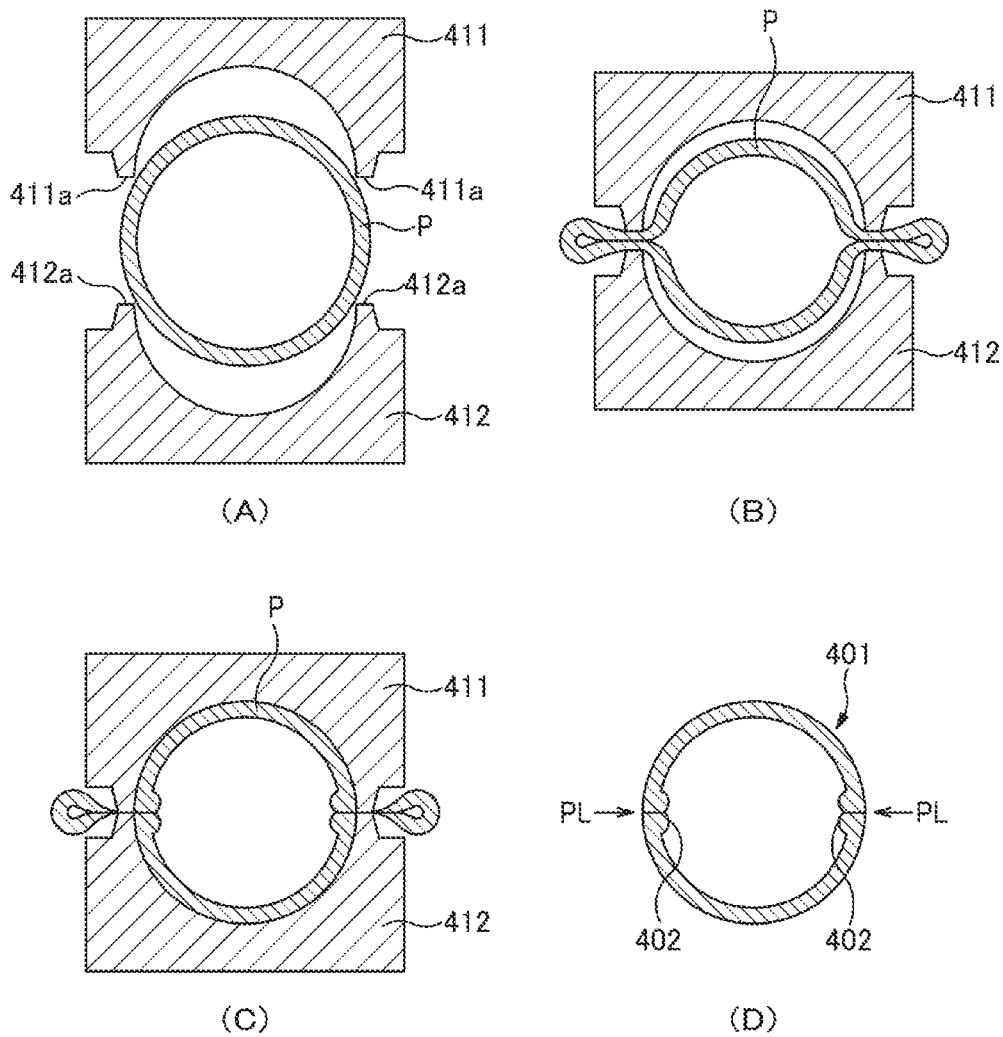

FIG. 40 shows a process of forming a cross-sectional shape of a prior foamed duct, (A) in FIG. 40 is a view showing a state in which a parison is supplied, (B) in FIG. 40 is a view showing a state in which mold closing is started, (C) in FIG. 40 is a view showing a state in which the mold is closed, and (D) in FIG. 40 is a view showing a cross-sectional shape of a foamed duct in which a thicker portion is formed.

Figure 41:
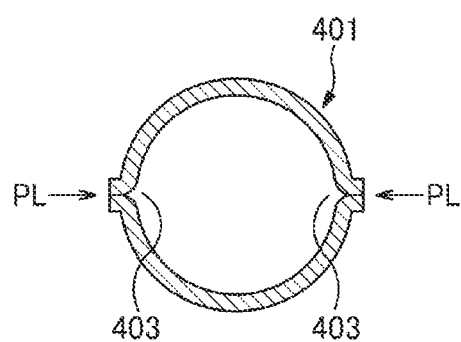

FIG. 41 shows another example of a cross-sectional shape of a prior foamed duct, and is a view showing a cross-sectional shape of a foamed duct having an inner surface provided with a groove portion.

DETAILED DESCRIPTION OF EMBODIMENTS

Hereinafter, embodiments of the present application will be described. The various feature matters shown in the embodiments shown below can be combined with each other. Furthermore, each feature matter constitutes an invention independently.

First Embodiment and Second Embodiment

1. Structure of Molding Machine 1

First, a molding machine 1 that can be used for implementing a method of manufacturing a molded article according to an embodiment of the present application will be described by using FIG. 1. The molding machine 1 has a resin supply device 2, a head 18, and split molds 19. The resin supply device 2 has a hopper 12, an extruder 13, an injector 16, and an accumulator 17. The extruder 13 and the accumulator 17 are connected via a connecting pipe 25. The accumulator 17 and the head 18 are connected via a connecting pipe 27. Hereinafter, each structure will be described in detail.

(Hopper 12 and Extruder 13)

The hopper 12 is used for introducing a raw material resin 11 into a cylinder 13a of the extruder 13. The form of the raw material resin 11 is not particularly limited, but is usually pellet-shaped. The raw material resin 11 is, for example, a thermoplastic resin such as polyolefin, and examples of the polyolefin may include low-density polyethylene, linear low-density polyethylene, high-density polyethylene, polypropylene, an ethylene-propylene copolymer, a mixture thereof, and so on. After the raw material resin 11 is introduced into the cylinder 13a from the hopper 12, it is heated in the cylinder 13a so as to be melted into a molten resin. Furthermore, it is conveyed to a front end of the cylinder 13a by rotation of a screw arranged in the cylinder 13a. The screw which is arranged in the cylinder 13a is rotated to simultaneously mix and convey the molten resin. A gear device is disposed at a base end of the screw, and the screw is rotationally driven by the gear device. The number of the screws arranged in the cylinder 13a may be one, or may also be two or more.

(Injector 16)

An injector 16 for injecting a foaming agent into the cylinder 13a is disposed in the cylinder 13a. When the raw material resin 11 is not to be foamed, the injector 16 can be omitted. Examples of the foaming agent injected from the injector 16 may include a physical foaming agent, a chemical foaming agent, and a mixture thereof, but a physical foaming agent is preferred. As the physical foaming agent, an inorganic physical foaming agent such as air, carbon dioxide gas, nitrogen gas, water, etc. and an organic physical foaming agent such as butane, pentane, hexane, dichloromethane, dichloroethane, etc. and further a supercritical fluid thereof may be used. The supercritical fluid is preferably produced by using carbon dioxide, nitrogen or the like. In the case of using nitrogen, the supercritical fluid is obtained at a critical temperature of −149.1° C. and at a critical pressure of 3.4 MPa or more, and in the case of using carbon dioxide, the supercritical fluid is obtained at a critical temperature of 31° C. and at a critical pressure of 7.4 MPa or more. Examples of the chemical foaming agent may include a chemical foaming agent which generates carbon dioxide gas by a chemical reaction between an acid (e.g., citric acid or salt thereof) and an alkali (e.g., sodium bicarbonate). The chemical foaming agent may also be introduced from the hopper 12, instead of being injected from the injector 16.

(Accumulator 17 and Head 18)

The molten resin 11a, to which the foaming agent is added or the foaming agent is not added, is extruded from a resin extrusion port of the cylinder 13a and injected into the accumulator 17 through the connecting pipe 25. The accumulator 17 has a cylinder 17a and a piston 17b slidable inside the cylinder 17a, wherein the molten resin 11a can be stored in the cylinder 17a. Moreover, after the molten resin 11a is stored in the cylinder 17a by a predetermined amount, the piston 17b is moved so that the molten resin 11a is extruded out and hung down, through the connecting pipe 27, from a die slit disposed in the head 18 so as to form a parison 23. The shape of the parison 23 is not specifically limited, and may be a cylindrical shape, or may be a sheet shape.

(Split Mold 19)

Figure 2:
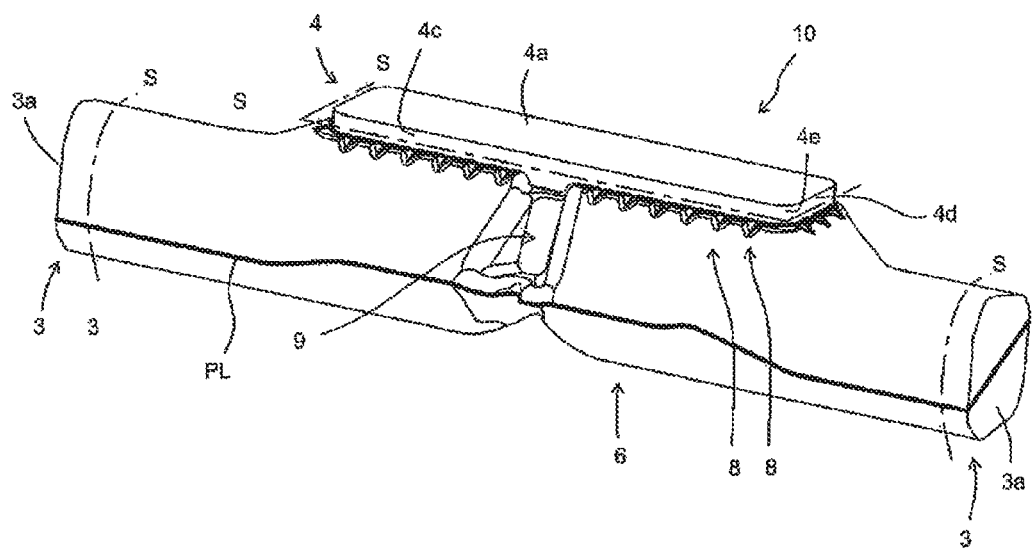
FIG. 2 is a perspective view showing a molded body 10 used for manufacturing a molded article 5 of a first embodiment of the present application.

The parison 23 is guided between a pair of split molds 19. The molding of the parison 23 is performed using the split molds 19, whereby a molded body 10 as shown in FIG. 2 is obtained. The molding method in which the split mold 19 is used is not particularly limited, and may be blow molding in which molding is performed by blowing air into a cavity defined by the split molds 19, or may be vacuum molding in which the molding of the parison 23 is performed by reducing the pressure in the cavity from an inner surface of the cavity of the split molds 19, or may be a combination thereof. When the molten resin contains a foaming agent, the parison 23 becomes a foamed parison, and the molded body 10 becomes a foamed molded body.

FIG. 2 shows a molded body 10 for manufacturing an air-conditioning duct. The molded body 10 has tubular portions 3 and 4 having one ends provided with closure portions 3a and 4a respectively. The tubular portion 4 is disposed to be erected from a tubular base portion 6. The tubular portions 3 are disposed at two ends of the base portion 6. In FIG. 2, the molded body 10 does not have a branched structure, but the tubular portion 3 may be branched so that the number of the tubular portions 3 is three, four, or more.

2. Molded Article of the First Embodiment and Method of Manufacturing the Same

A molded article of the first embodiment of the present application and a method of manufacturing the same will be described by using FIGS. 1 to 6. The method of the present embodiment comprises a molded body formation step and a cut-off step. The details will be described below.

2.1 Molded Body Formation Step

Figure 1:
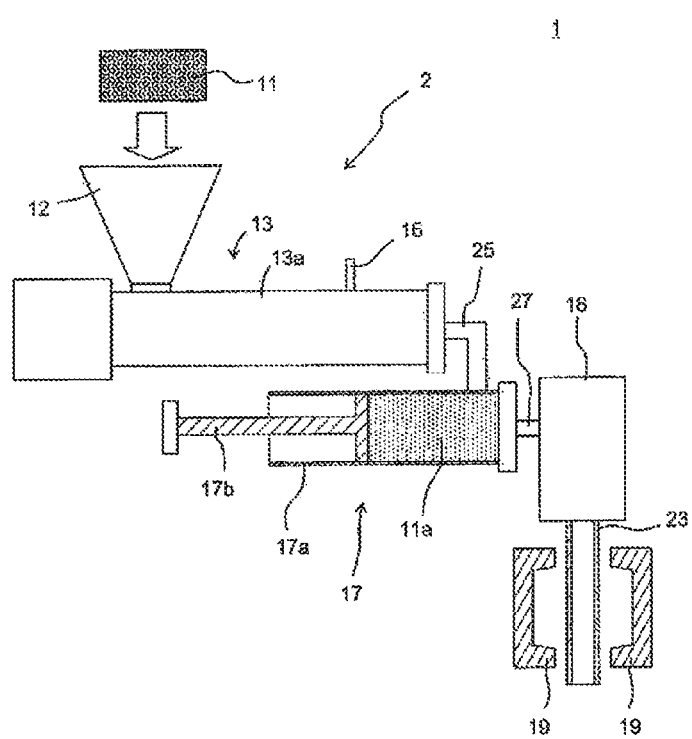
FIG. 1 is an example of a molding machine 1 that can be used in a manufacturing method according to an embodiment of the present application.

As shown in FIGS. 1 to 2, in this step, a molded body 10 is formed by molding a molten resin 11a, wherein the molded body 10 comprises tubular portions 3 and 4 having one ends provided with closure portions 3a and 4a respectively. This step can be carried out using the molding machine 1 described above. The effect of the present application can be obtained no matter whether the molded body 10 is a solid molded article or a foamed molded article. But when the molded body 10 is a foamed molded article, the shapes of opening portions 3b and 4b will be remarkably changed by removing the closure portions 3a and 4a through cutting, therefore use of the present application is of particularly great technical significance when the molded body 10 is a foamed molded article. The expansion ratio of the foamed molded article is, for example, 1.5 to 5, preferably 2 to 4, and specifically, for example, 1.5, 2, 2.5, 3, 3.5, 4, 4.5, or 5, or may be within a range between any two of the numerical values exemplified herein. The thickness of the foamed molded article is, for example, 1 to 7 mm, preferably 1.5 to 5 mm, and specifically, for example, 1, 1.5, 2, 2.5, 3, 3.5, 4, 4.5, 5, 5.5, 6, 6.5, or 7 mm, or may be within a range between any two of the numerical values exemplified herein.

2.2 Cut-Off Step

Figure 3:
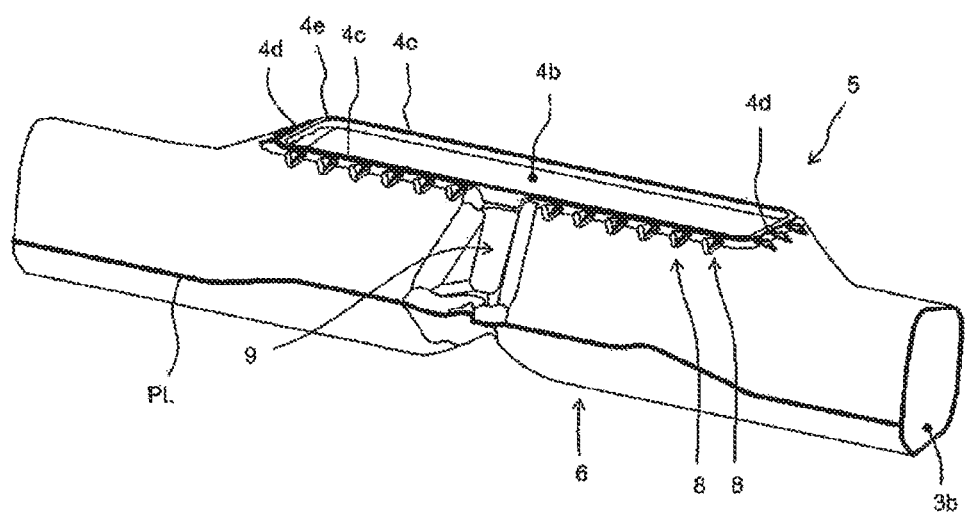
FIG. 3 shows a molded article 5 obtained by removing closure portions 3a and 4a from the molded body 10 of FIG. 2.

As shown in FIGS. 2 and 3, in this step, the closure portions 3a and 4a are removed by cutting the tubular portions 3 and 4 along cutting lines S indicated by dot-and-dash lines. Thus, as shown in FIGS. 3-5, opening portions 3b and 4b are formed in the tubular portions 3 and 4 to obtain a molded article 5.

However, residual stress is present in the molded body 10 formed by molding the molten resin 11a, and the residual stresses of individual parts are balanced in a state in which the closure portions 3a and 4a are disposed. If the closure portions 3a and 4a are cut off, the balance of the residual stresses is broken, thereby the opening portions 3b and 4b are deformed. Although the opening portions 3b and 4b are all deformed, generally the opening portion 3b, 4b with a larger area has a larger change in shape, and therefore there is a remarkable change in shape at the opening portion 4b. Therefore, in the present embodiment, the deformation of the opening portion 4b is suppressed by disposing ribs 8 and 9 at positions adjacent to the tubular portion 4 and the opening portion 4b.

The tubular portion 4 and the opening portion 4b are in a rectangular shape. Therefore, the side wall of the tubular portion 4 and the peripheral edge of the opening portion 4b have a pair of long-side portions 4c opposite to each other and a pair of short-side portions 4d disposed to be connected with the pair of long-side portions 4c. The long-side portion 4c and the short-side portion 4d are connected at a corner portion 4e. The length of the long-side portion 4c is, for example, 100 to 500 mm, and specifically, for example, 100, 150, 200, 250, 300, 350, 400, 450, or 500 mm, or may be within a range between any two of the numerical values exemplified herein. The length of the short-side portion 4d is, for example, 50 to 250 mm, and specifically, for example, 50, 100, 150, 200, or 250 mm, or may be within a range between any two of the numerical values exemplified herein. The ratio of the length of the long-side portion 4c to the length of the short-side portion 4d is, for example, 1.5-5, and specifically, for example, 1.5, 2, 2.5, 3, 3.5, 4, 4.5, or 5 mm, or may be within a range between any two of the numerical values exemplified herein. The radius of curvature of the corner portion 4e is, for example, 1 to 30 mm, and specifically, for example, 1, 5, 10, 15, 20, 25, or 30 mm, or may be within a range between any two of the numerical values exemplified herein. The tubular portion 4 is disposed to be erected from the base portion 6. The height of the tubular portion 4 is, for example, 10 to 50 mm, and specifically, for example, 10, 15, 20, 25, 30, 35, 40, 45, or 50 mm, or may be within a range between any two of the numerical values exemplified herein.

Figure 4:
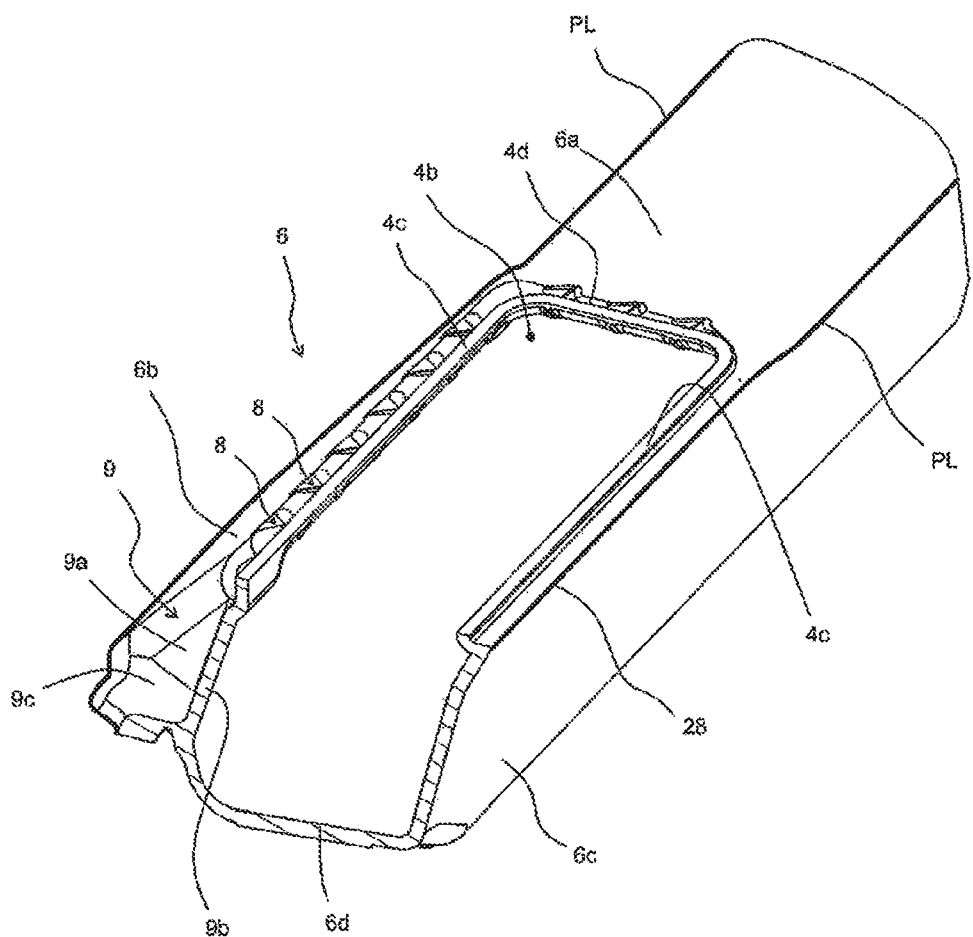
FIG. 4 is a sectional perspective view taken through the center of a rib 9 of the molded article 5 of FIG. 3.
Figure 5:
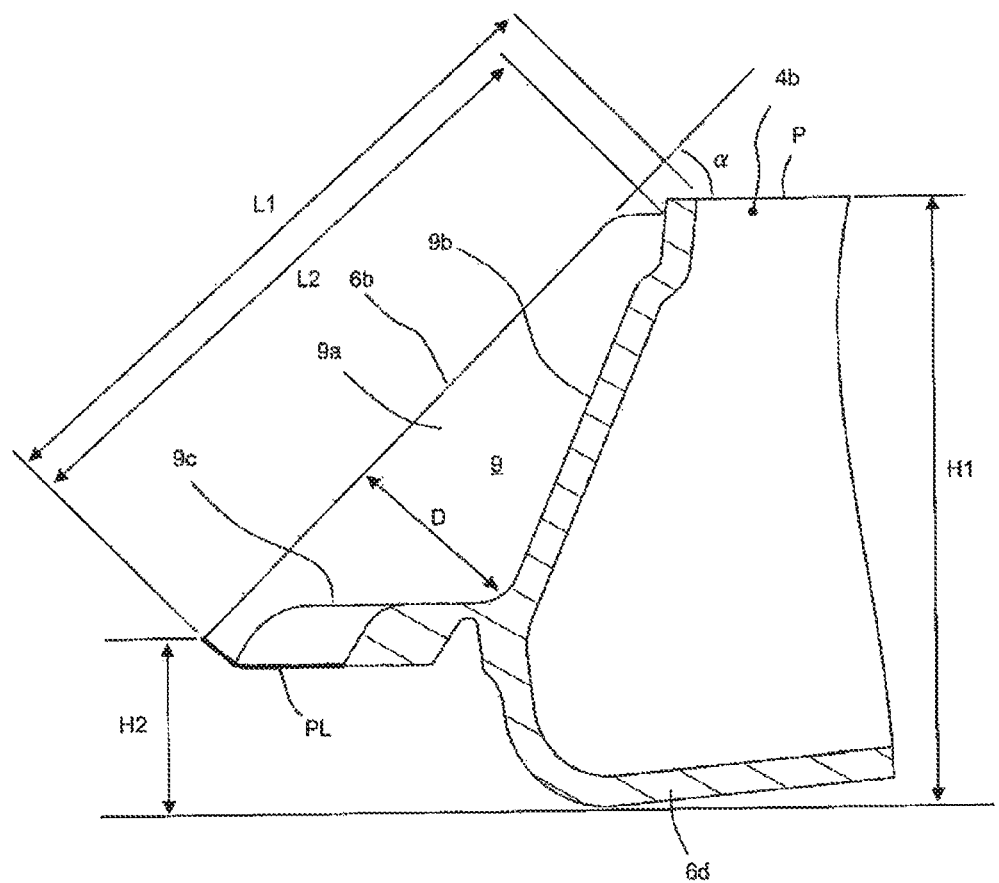
FIG. 5 is a sectional view in which the vicinity of the section in the sectional perspective view of FIG. 4 is enlarged.

As shown in FIGS. 3 to 5, the base portion 6 is in a tubular shape. The base portion 6 has a base wall 6a, side walls 6b and 6c, and an opposite wall 6d. The tubular portion 4 and the opening portion 4b are formed on the base wall 6a. The side walls 6b and 6c are substantially parallel to each other. The opening portion 4b is disposed between the side walls 6b and 6c. The opposite wall 6d is opposite to the opening portion 4b. The side walls 6b and 6c are connected by the opposite wall 6d. As shown in FIG. 5, an angle α between an opening surface (a surface formed by the peripheral edge of the opening portion 4b) P and the side wall 6b is preferably 20 to 80 degrees, preferably 30 to 60 degrees, and preferably 40 to 50 degrees. The smaller the angle is, the more easily the side wall 6b is tilted in a direction in which the opening portion 4b is narrowed, therefore it is of remarkable technical significance to suppress the deformation of the opening portion 4b by disposing the ribs 8 and 9.

The rib 8 is a V-groove-shaped rib, and multiple ribs are disposed along the long-side portion 4c on the side of the side wall 6b and along the pair of short-side portions 4d. The rigidity of the peripheral edge of the opening portion 4b is reinforced by the ribs 8. On the side of the side wall 6c, at a position adjacent to the long-side portion 4c, a parting line PL is disposed along the long-side portion 4c, and a beam portion 28 is disposed along the parting line PL to improve the strength.

As shown in FIG. 3, the rib 9 is disposed in the center of the long-side portion 4c at the side wall 6b side between the parting line PL and the opening portion 4b. In the opening portion 4b, the vicinity of the center of the long-side portion 4c is most likely to be largely deformed, and the deformation of the long-side portion 4c is suppressed by the rib 9. As shown in FIGS. 4 and 5, the rib 9 is disposed to extend from the parting line PL to the opening portion 4b. The thickness of the molded article 5 becomes larger as it extends closer to the parting line PL, therefore the deformation of the opening portion 4b is suppressed by disposing the rib 9 extending from the parting line PL to the opening portion 4b.

The rib 9 is in a groove shape and has a pair of side walls 9a, a bottom wall 9b, and an end wall 9c. The bottom wall 9b is disposed between the pair of side walls 9a. The end wall 9c is connected to the side walls 9a and the bottom wall 9b. The end wall 9c is disposed on the parting line PL. The end wall 9c is formed by compressing the parison 23 by split molds 19 during the molding, and thus has high strength.

If the distance between the parting line PL and the opening portion 4b is set to be L1 and the length of the side wall 9a is set to be L2, L2/L1 is preferably 0.5 or more, and L2/L1 is, for example, 0.5-1, and specifically, for example, 0.5, 0.6, 0.7, 0.8, 0.9, 0.95, or 1, or may be within a range between any two of the numerical values exemplified herein. In the present embodiment, the side walls 9a are connected to the parting line PL. The deformation of the opening portion 4b is particularly suppressed by connecting the side walls 9a and the parting line PL.

If the distance from an outer surface of the opposite wall 6d to the opening surface P is set to be H1 and the distance from the outer surface of the opposite wall 6d to the parting line PL is set to be H2, H2/H1 is preferably 0.7 or less, and further preferably 0.5 or less. At this time, since the opening portion 4b is away from the parting line PL so that the opening portion 4b is particularly easily deformed, it is of particularly remarkable significance to suppress the deformation of the opening portion 4b by disposing the rib 9. The H2/H1 is, for example, 0 to 0.7, and specifically, for example, 0, 0.1, 0.2, 0.3, 0.4, 0.5, 0.6, or 0.7, or may be within a range between any two of the numerical values exemplified herein.

The rib 9 is disposed such that its depth increases as it extends away from the opening portion 4b. If the depth at the deepest portion of the rib 9 is set to be D and the thickness of the bottom wall 9b of the rib 9 is set to be T, D/T is preferably 2 or more. The D/T is, for example, 2 to 20, and specifically, for example, 2, 3, 4, 5, 6, 7, 8, 9, 10, 15, or 20, or may be within a range between any two of the numerical values exemplified herein. The larger the thickness T is, the more easily the opening portion 4b is deformed, but the effect of suppressing the deformation is increased by increasing the depth D, and therefore the deformation of the opening portion 4b can be effectively suppressed regardless of the thickness of the molded article 5 by setting the value of D/T in the above-mentioned range.

As shown in FIG. 4, the parting line PL on the side of the side wall 6c is disposed along the long-side portion 4c at a position adjacent to the long-side portion 4c. On the parting line PL, a beam portion 28 protruding from the side wall 6c is disposed. The beam portion 28 is disposed along the long-side portion 4c, and the deformation of the long-side portion 4c is suppressed by the beam portion 28.

3. Molded Article of the Second Embodiment and Method of Manufacturing the Same

A molded article of the second embodiment of the present application and a method of manufacturing the same will be described by using FIGS. 6 and 7. The present embodiment is similar to the first embodiment, and the main difference is that the shapes of the ribs are different. Hereinafter, the description will be centered around the difference.

3.1 Molded Body Formation Step

Figure 6:
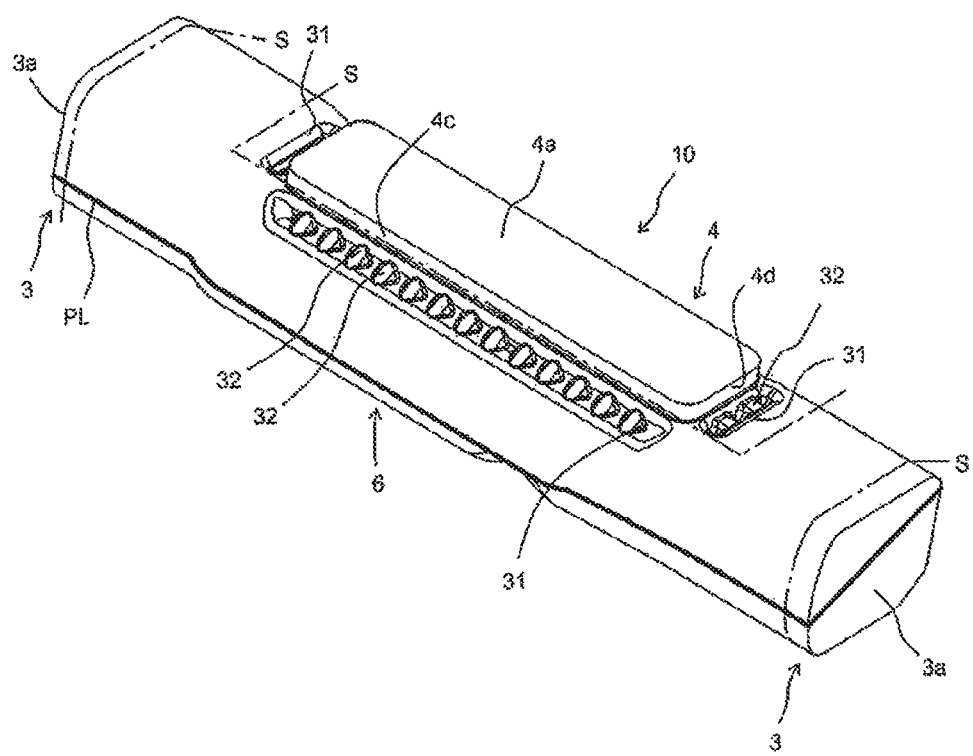
FIG. 6 is a perspective view showing a molded body 10 used for manufacturing a molded article 5 of a second embodiment of the present application.

In this step, as shown in FIG. 1 and FIG. 6, similarly to the first embodiment, a molded body 10 is formed by molding a molten resin 11a, wherein the molded body has tubular portions 3 and 4 having one ends provided with closure portions 3a and 4a respectively.

2.2 Cut-Off Step

Figure 7:
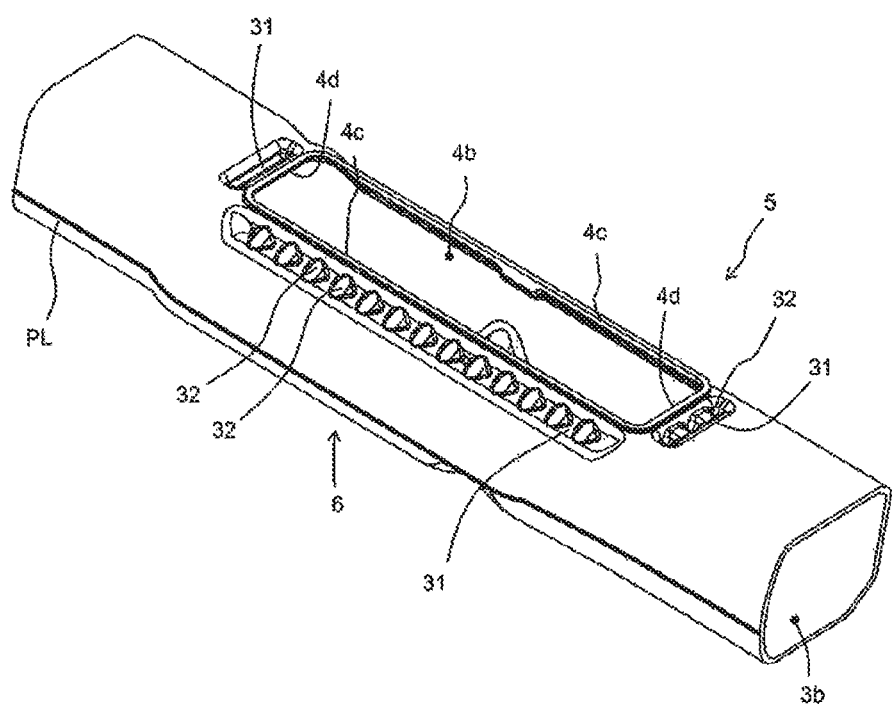
FIG. 7 shows a molded article 5 obtained by removing the closure portions 3a and 4a from the molded body 10 of FIG. 6.
Figure 8:
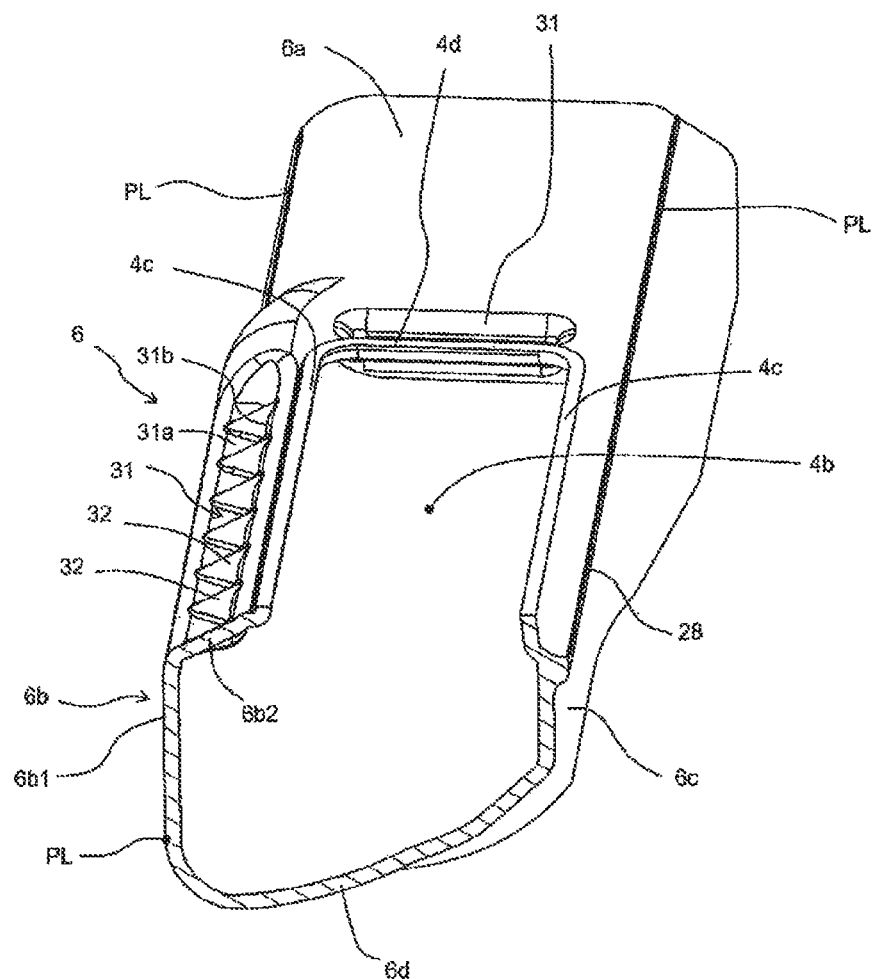
FIG. 8 is a sectional perspective view taken through the center of the molded article 5 of FIG. 7.

As shown in FIGS. 6 and 7, in this step, the closure portions 3a and 4a are removed by cutting the tubular portions 3 and 4 along cutting lines S indicated by dot-and-dash lines. Thus, as shown in FIGS. 7 and 8, opening portions 3b and 4b are formed in the tubular portions 3 and 4 to obtain a molded article 5. A force enabling the opening portion 4b to deform will be generated when cutting to remove the closing position 4a, but in the present embodiment, the deformation of the opening portion 4b is suppressed by disposing a beam rib 31 and a rib 32 at positions adjacent to the tubular portion 4 and the opening portion 4b.

Figure 9:
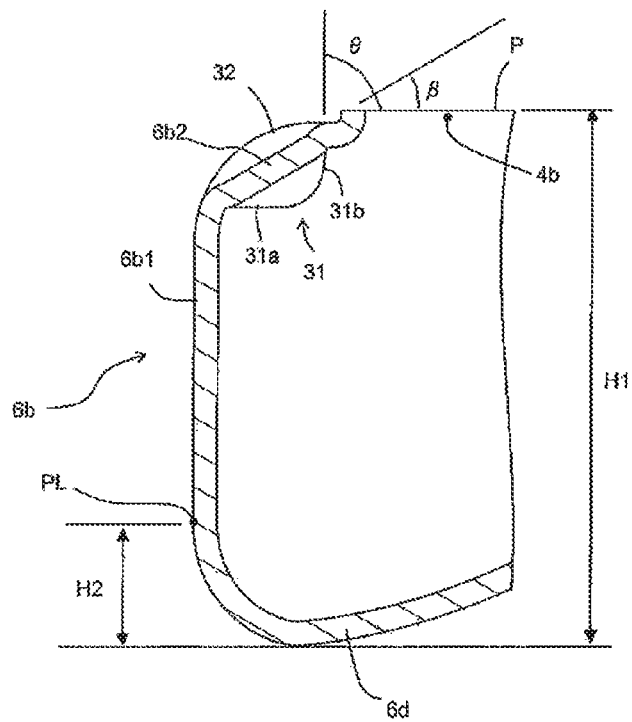
FIG. 9 is a sectional view in which the vicinity of the section in the sectional perspective view of FIG. 4 is enlarged.

The base structure of the base portion 6 is the same as that of the first embodiment, but in the present embodiment, as shown in FIGS. 8 and 9, the side wall 6b is constituted by an upright wall 6b1 and an inclined wall 6b2. The upright wall 6b1 is disposed upright substantially perpendicularly to the opening surface P. The inclined wall 6b2 is inclined with respect to the upright wall 6b1. An angle β between the opening surface P and the inclined wall 6b2 is preferably 5 to 70 degrees, and further preferably 10 to 45 degrees. The angle β is specifically, for example, 5, 10, 15, 20, 25, 30, 35, 40, 45, 50, 55, 60, 65, or 70 degrees, or may be within a range between any two of the numerical values exemplified herein.

The beam rib 31 is disposed between the parting line PL and the opening portion 4b. The beam ribs 31 are each constituted by a groove-shaped concave portion, and are disposed along the long-side portion 4c on the side of the side wall 6b and along the pair of short-side portions 4d. The rigidity of the peripheral edge of the opening portion 4b is reinforced by the beam ribs 31. On the side of the side wall 6c, at a position adjacent to the long-side portion 4c, a parting line PL is disposed along the long-side portion 4c, and a beam portion 28 is disposed along the parting line PL so as to improve the rigidity.

In the side wall 6b, the beam rib 31 is disposed at the inclined wall 6b2. As shown in FIGS. 8 and 9, the beam rib 31 is formed in such a manner that a bottom wall 31a and a side wall 31b are formed at the inclined wall 6b1. In the sectional view of FIG. 9, the inclined wall 6b1, the bottom wall 31a, and the side wall 31b form a substantially triangular shape. The bottom wall 31*a* is substantially parallel to the opening surface P. An angle between the bottom wall 31*a* and the opening surface P is preferably 0 to ±30 degrees. The angle is specifically, for example, −30, −20, −10, 0, 10, 20, or 30 degrees, or may be within a range between any two of the numerical values exemplified herein. An angle θ between the side wall 31*b* and the opening surface P is preferably 60 to 120 degrees, and further preferably 75 to 105 degrees. The angle θ is specifically, for example, 60, 65, 70, 75, 80, 85, 90, 95, 100, 105, 110, 115, or 120 degrees, or may be within a range between any two of the numerical values exemplified herein.

A plurality of ribs 32 are connected to the beam rib 31. The ribs 32 are disposed to extend from the beam rib 31 toward the opening portion 4*b*. The ribs 32 are disposed to connect the bottom wall 31*a* and the side wall 31*b* of the beam rib 31. The ribs 32 are disposed in the groove-shaped concave portion constituting the beam rib 31. The rigidity of the peripheral edge of the opening portion 4*b* is further improved by the ribs 32.

If the distance from an outer surface of the opposite wall 6*d* to the opening surface P is set to be H1 and the distance from the outer surface of the opposite wall 6*d* to the parting line PL is set to be H2, H2/H1 is preferably 0.7 or less, and further preferably 0.5 or less. At this time, since the opening portion 4*b* is away from the parting line PL so that opening portion 4*b* is particularly easily deformed, it is of particularly remarkable significance to suppress the deformation of the opening portion 4*b* by disposing the rib 9. The H2/H1 is, for example, 0 to 0.7, and specifically, for example, 0, 0.1, 0.2, 0.3, 0.4, 0.5, 0.6, or 0.7, or may be within a range between any two of the numerical values exemplified herein.

Third Embodiment

FIG. 10 shows a molded body 110 for manufacturing an air-conditioning duct. The molded body 110 includes tubular portions 103 and 104 provided with closure portions 103*a* and 104*a* at one ends thereof respectively. The tubular portion 104 is disposed to be erected from a tubular base portion 106. The tubular portion 103 is branched from the base portion 106.

2. Method of Manufacturing the Molded Article

Here, a method of manufacturing the molded article of the third embodiment of the present application will be described by FIGS. 10 to 27. The method of the present embodiment comprises a molded body formation step and a cut-off step. The details will be described below. In addition, the structure of the molding machine is the same as the preceding embodiment, as shown in FIG. 1.

2.1 Molded Body Formation Step

As shown in FIG. 1 and FIGS. 10 and 11, in this step, a molded body 110, which comprises tubular portions 103 and 104 having one ends provided with closure portions 103*a* and 104*a* respectively, is formed by molding a molten resin 11*a*. This step can be carried out using the molding machine 1 described above. The effect of the present application can be obtained no matter whether the molded body 110 is a solid molded body or a foamed molded body. But when the molded body 110 is a foamed molded body, the shapes of the tubular portions 103 and 104 will be remarkably changed by cutting off the closure portions 103*a* and 104*a*, and therefore use of the present application is of particularly great technical significance when the molded body 110 is a foamed molded body. The expansion ratio of the foamed molded body is, for example, 1.5 to 5, preferably 2 to 4, and specifically, for example, 1.5, 2, 2.5, 3, 3.5, 4, 4.5, or 5, or may be within a range between any two of the numerical values exemplified herein. The thickness of the foamed molded body is, for example, 1 to 7 mm, preferably 1.5 to 5 mm, and specifically, for example, 1, 1.5, 2, 2.5, 3, 3.5, 4, 4.5, 5, 5.5, 6, 6.5, or 7 mm, or may be within a range between any two of the numerical values exemplified herein.

2.2 Cut-Off Step

As shown in FIGS. 10 and 11, in this step, the closure portions 103*a* and 104*a* are removed by cutting the tubular portions 103 and 104 along linear cutting lines S indicated by dot-and-dash lines. Thus, as shown in FIGS. 12 and 13, opening portions 103*b* and 104*b* are formed in the tubular portions 103 and 104 to obtain a molded article 105.

However, residual stress is present in the molded body 110 formed by molding the molten resin 11*a*, and the residual stresses of individual parts are balanced in a state in which the closure portions 103*a* and 104*a* are disposed so that a shape shown in FIGS. 10 and 11 is maintained. If the closure portions 103*a* and 104*a* are cut off, the balance of the residual stresses is broken, and thereby the tubular portions 103 and 104 and a peripheral edge portion 106*a* thereof are deformed. Although the tubular portions 103 and 104 are all deformed, generally, there is a larger change in shape when the opening portion 103*b*, 104*b* has a larger area, and therefore there is a remarkable change in shape at the tubular portion 104. Therefore, hereinafter, the change in shape at the tubular portion 104 will be described as an example.

The shape of the opening portion 104*b* of the tubular portion 104 is a rectangular shape. Therefore, the side wall of the tubular portion 104 has a pair of long-side portions 104*c* opposite to each other and a pair of short-side portions 104*d* disposed to connect the pair of long-side portions 104*c*. The long-side portion 104*c* and the short-side portion 104*d* are connected at a corner portion 104*e*. The length of the long-side portion 104*c* is, for example, 100 to 500 mm, and specifically, for example, 100, 150, 200, 250, 300, 350, 400, 450, or 500 mm, or may be within a range between any two of the numerical values exemplified herein. The length of the short-side portion 104*d* is, for example, 50 to 250 mm, and specifically, for example, 50, 100, 150, 200, or 250 mm, or may be within a range between any two of the numerical values exemplified herein. The ratio of the length of the long-side portion 104*c* to the length of the short-side portion 104*d* is, for example, 1.5 to 5, and specifically, for example, 1.5, 2, 2.5, 3, 3.5, 4, 4.5, or 5 mm, or may be within a range between any two of the numerical values exemplified herein. The radius of curvature of the corner portion 104*e* is, for example, 1 to 30 mm, and specifically, for example, 1, 5, 10, 15, 20, 25, or 30 mm, or may be within a range between any two of the numerical values exemplified herein. The tubular portion 104 is disposed to be erected from the base portion 6. The height of the tubular portion 104 is, for example, 10 to 50 mm, and specifically, for example, 10, 15, 20, 25, 30, 35, 40, 45, or 50 mm, or may be within a range between any two of the numerical values exemplified herein. The base portion 106 is tubular. Furthermore, the base portion 106 is flat at the peripheral edge portion 106*a* of the peripheral edge of the tubular portion 104. Further, an adjacent wall 106*b* adjacent to the peripheral edge portion 106*a* is disposed at a substantially right angle with respect to the peripheral edge portion 106*a*.

If the tubular portion 104 is cut along the linear cutting line S indicated by the dot-and-dash line in (b) in FIG. 11 to remove the closure portion 104*a*, the opening portion 104*b* is exposed as shown in FIGS. 12 and 13. At this time, if the shape of the tubular portion 104 is not changed, the shape of the opening portion 104b should be a rectangle, but actually, the balance of the residual stress is broken by removing the closure portion 104a, so that the shapes of the tubular portion 104 and the peripheral edge portion 106a are changed. In general, as shown in (a) in FIG. 13, the long-side portion 104c is bent in such a manner that the center of the long-side portion 104c of the tubular portion 104 faces the opening portion 104b; or as shown in (b) in FIG. 13, at the center of the long-side portion 104c, the cut end 104f of the tubular portion 104 and the peripheral edge portion 106a are bent in a recessed manner.

In order to solve such a problem, in consideration of the deformation of the tubular portion 104, as shown in (a) FIG. 14, the molded body 110 can be formed in such a manner that the long-side portion 104c is bent in a direction in which the center of the long-side portion 104c of the tubular portion 104 is away from the opening portion 104b. As shown in (C) in FIG. 14, it is preferable that the long-side portion 104c is bent into a shape, such that the long-side portion 104c has a deformation amount E1 of 1 to 5 mm at the center thereof and has a deformation amount of 0 mm at the corner portion 104e, and that the deformation amount gradually decreases as being closer to the corner portion 104e from the center. The deformation amount E1 is specifically, for example, 1, 1.5, 2, 2.5, 3, 3.5, 4, 4.5, or 5 mm, or may be within a range between any two of the numerical values exemplified herein. If the closure portion 104a is cut off along the cutting line S in this state, as shown in (a) in FIG. 15, the long-side portion 104c is deformed in such a manner that the center of the long-side portion 104c is made to face the opening portion 104b, so that the long-side portion 104c becomes linear, and the problem that the opening portion 104b does not have a rectangular shape is solved. However, as shown in (b) in FIG. 15, there is still a problem that the cut end 104f of the tubular portion 104 and the peripheral edge portion 106a are bent in a recessed manner.

As shown in (b) in FIG. 16, the molded body 110 can be formed in such a manner that the closure portion 104a and the peripheral edge portion 106a are bent so as to bulge in the direction in which the tubular portion 104 is erected (more specifically, the closure portion 104a and the peripheral edge portion 106a are bent to bulge most at the center of the long-side portion 104c in the direction in which the tubular portion 104 is erected). As shown in (c) of FIG. 16, it is preferable that the peripheral edge portion 106a is bent into a shape, such that the peripheral edge portion has a deformation amount E2 of 1 to 5 mm at the center of the long-side portion 104c and has a deformation amount of 0 mm at the corner portion 104e, and that the deformation amount gradually decreases as being closer to the corner portion 104e from the center. The deformation amount E2 is specifically, for example, 1, 1.5, 2, 2.5, 3, 3.5, 4, 4.5, or 5 mm, or may be within a range between any two of the numerical values exemplified herein. If the closure portion 104a of the molded body 110 is cut off along the cutting line S, as shown in FIG. 17, the recess of the peripheral edge portion 106a is eliminated so that it is flattened, but the cut end 104f is still bent in a recessed manner. If the cut end 104f is bent, there is a problem such as poor joining of the molded article 105 with other members.

In the present embodiment, in order to solve this problem, the tubular portion 104 is cut in a state in which the side wall (long-side portion 104c) of the tubular portion 104 is made to be warped in a plane (in-plane) by an external force. If the side wall of the tubular portion 104 is warped in a plane by an external force, a restoring force in the in-plane direction is generated at the side wall of the tubular portion 104. Therefore, if the closure portion 104a is cut off in a state in which the side wall of the tubular portion 104 is warped in a plane by an external force so as to generate a restoring force counteracting the residual stress, the residual stress and the restoring force counteract each other, such that the deformation of the cut end 104f of the tubular portion 104 is suppressed. Here, the term "in a plane (in-plane)" means "in a plane perpendicular to the opening portion 104b", when expressed in another way.

Hereinafter, the description will be made more specifically by using FIG. 18. (a) in FIG. 18 shows a molded body 110 the same as that of FIG. 16, and the closure portion 104a and the peripheral edge portion 106a are bent to bulge in a direction in which the tubular portion 104 is erected. The base portion 106 has a base wall 106d provided with the tubular portion 104 and an opposite wall 106c opposite thereto, and the molded body 110 is placed on a placement surface such that the opposite wall 106c abuts against the placement surface.

In (b) in FIG. 18, if an external force F is applied to the peripheral edge portion 106a so that the peripheral edge portion 106a is warped so as to be flattened, the long-side portion 104c adjacent to the peripheral edge portion 106a is also warped similarly, therefore the long-side portion 104c, in a plane, is warped in a direction in which the center of the long-side portion 104c (the center of the pair of corner portions 104e when expressed in another way) is away from the closure portion 104a. The closure portion 104a is flattened by the warping of the long-side portion 104c. Furthermore, in this state, since a restoring force acts in a direction opposite to the external force F, the molded body 110 is returned to the shape in (a) in FIG. 18 if the external force F is removed.

Then, in a state in which the external force F is applied to the peripheral edge portion 106a, the tubular portion 104 is cut along the linear cutting line S indicated by the dot-and-dash line to cut off the closure portion 104a, whereby a molded article 105 shown in (c) in FIG. 18 is obtained. In this state, the residual stress and the restoring force acting on the peripheral edge portion 106a and the long-side portion 104c are balanced. Therefore, even if the external force F is removed, the peripheral edge portion 106a and the long-side portion 104c are not returned to the bulged state, and as shown in (c) in FIG. 18, the peripheral edge portion 106a and the cut end 104f are maintained in a flat state, therefore the above-mentioned problem of bending of the cut end 104f is solved.

The present application can also be implemented in the following manner. The closure portion 104a can be removed using a cutting jig 107 shown in FIG. 19. The cutting jig 107 has a jig opening portion 107a, wherein the jig opening portion 107a is configured to be capable of accommodating the tubular portion 104. The jig opening portion 107a has a shape slightly larger than the outer shape of the tubular portion 104. Therefore, as shown in (a) in FIG. 20, if the molded body 110 is disposed on the cutting jig 107 in such a manner that the tubular portion 104 is accommodated in the jig opening portion 107a, as shown in (b) in FIG. 20, the peripheral edge portion 106a abuts against the cutting jig 107. In this state, as shown in (b) in FIG. 21, if an external force F is applied to the opposite wall 106c, to make the peripheral edge portion 106a pressed against the cutting jig 107 so that the peripheral edge portion 106a is deformed so as to be flattened, as shown in (a) in FIG. 21, the long-side portion 104c is also deformed similarly so that the closure portion 104a is flattened. If the tubular portion 104 is cut in this state to remove the closure portion 104a, the peripheral edge portion 106a and the long-side portion 104c are not returned to the bulged state even if the external force F is removed, and as shown in (c) in FIG. 18, the peripheral edge portion 106a and the cut end 104f are maintained in a flat state.

In the embodiment of FIG. 18, the closure portion 104a is in a curved shape, but as shown in (a) in FIG. 22, the closure portion 104a may be flat. Even in this case, as shown in (b) in FIG. 22, the same function and effect as those of the embodiment of FIG. 18 can be obtained by cutting the tubular portion 104 along the cutting line S in a state in which an external force F is applied to the peripheral edge portion 106a such that the peripheral edge portion 106a is warped so as to be flattened.

As a method of warping the side wall of the tubular portion 104, as shown in (b) in FIG. 23, a method of applying an external force F to the closure portion 104a may also be employed. Even in this case, the same function and effect as those of the embodiment of FIG. 18 can be obtained by removing the closure portion 104a along the cutting line S in a state in which an external force F is applied to the closure portion 104a.

As a method of warping the side wall of the tubular portion 104, as shown in (b) in FIG. 24, it is also possible to flatten the peripheral edge portion 106a and the closure portion 104a by applying an external force F in such a manner that the entire molded body 110 is bent. Even in this case, the same function and effect as those of the embodiment of FIG. 18 can be obtained by cutting the tubular portion 104 along the cutting line S in a state in which an external force F is applied.

In the embodiment of FIG. 18, as shown in FIG. 25, if the tubular portion 104 is removed, the cross-sectional shape of the base portion 106 is a substantially square shape, and an adjacent wall 106b disposed adjacent to the peripheral edge portion 106a has an angle $\alpha$ of about 90 degrees with respect to the peripheral edge portion 106a. Therefore, the peripheral edge portion 106a is supported by the adjacent wall 106b, and thus the peripheral edge portion 106a is less likely to be recessed. On the other hand, in the embodiment shown in FIG. 25, the adjacent wall 106b has an angle $\alpha$ of about 75 degrees or less (specifically, 45 degrees) with respect to the peripheral edge portion 106a, and in such a configuration, the peripheral edge portion 106a can hardly be supported by the adjacent wall 106b, and therefore the peripheral edge portion 106a tends to be recessed. In such a configuration, use of the present application is of particularly great technical significance. The angle $\alpha$ is specifically, for example, 5, 10, 15, 20, 25, 30, 35, 40, 45, 50, 55, 60, 65, 70, or 75 degrees, or may be within a range between any two of the numerical values exemplified herein.

In the embodiment of FIG. 18, the tubular portion 104 is cut in such a manner that a part (the long-side portion 104c) of the tubular portion 104 is retained, however, as shown in FIG. 27, the tubular portion 104 may also be cut without retaining the tubular portion 104.

Fourth Embodiment

When ducts are to be connected, it is necessary to align the positions of the ducts to be connected. If the ducts are connected in a state in which there is a positional deviation between the ducts, various failures such as air leakage may occur.

However, in the case of ducts molded by for example blow molding, there is a problem that it is difficult to exactly perform the positional alignment. The blow-molded duct often has a deviation in thickness, for example, an inner surface of a duct to be inserted externally (a duct inserted in such a manner that an open end thereof is located on the outer side) is often not constant (uniform). Furthermore, since the ends of the respective ducts become open ends with burrs being cut off therefrom, a deviation in length easily occurs. Therefore, it is very difficult to perform positioning by abutting an inner circumferential surface of an outer duct, an outer circumferential surface of an inner duct and end surfaces thereof or the like.

When mounting holes for allowing bolts or clips or the like to be inserted are formed in the respective ducts and are aligned (positional alignment), a worker may perform the positional alignment by peeping through the holes or the like, but the accuracy of the alignment is greatly affected by the skill of the worker and it takes working time, so its improvement is desired.

An object of the present embodiment is to provide a duct connection structure and connection method, by which positional alignment of ducts can be performed simply and highly-accurately even for, for example, blow-molded ducts.

In order to achieve the preceding object, the duct connection structure of the present embodiment is a duct connection structure formed by inserting and connecting an open end of a second duct into an open end of a first duct, which is characterized in that positioning marks having inclined lines inclined with respect to the insertion direction are formed on the first duct and the second duct respectively, and the ducts are connected in a state of being aligned with each other by aligning these positioning marks.

Furthermore, the duct connection method of the present embodiment is a duct connection method, in which an open end of a second duct is inserted and connected into an open end of a first duct, which is characterized in that positioning marks having inclined lines inclined with respect to the insertion direction are formed on the first duct and the second duct respectively, and the ducts are connected in a state of being aligned with each other by aligning these positioning marks.

If the positioning marks having inclined lines inclined with respect to the insertion direction are used and the positioning marks formed on the respective ducts are made coincident with each other, the first duct and the second duct are reliably aligned and connected with each other. Furthermore, for example, in the cutting for forming the open end of the first duct, even if a deviation occurs in the cutting position, the positional alignment of the positioning marks having inclined lines is not adversely affected.

According to the present embodiment, a ducting structure with high reliability can be provided, in which positional alignment of ducts can be performed simply and highly-accurately even for, for example, blow-molded ducts.

Hereinafter, embodiments of the duct connection structure and connection method of the present embodiment will be described in detail with reference to the drawings.

In the duct connection structure and connection method of the present embodiment, the connection is performed by inserting the open end of the second duct into the open end of the first duct.

Here, each duct is, for example, a foamed duct having a circular cross section, and is a lightweight automotive duct for circulating cold and warm air supplied from an air conditioner unit to a desired location. Such a foamed duct is molded, for example, by performing mold closing through split molds on a thermoplastic resin mixed with a foaming agent and performing blow molding.

Examples of the thermoplastic resin used may include, for example, a polypropylene resin or the like. A blended resin mixed with 1 to 20% by mass of a polyolefin-based polymer or 5 to 40% by mass of a hydrogenated styrene-type thermoplastic elastomer, or the like may be used.

Examples of the foaming agent may include a physical foaming agent, a chemical foaming agent, and a mixture thereof. As the physical foaming agent, an inorganic physical foaming agent such as air, carbon dioxide gas, nitrogen gas, water, etc. and an organic physical foaming agent such as butane, pentane, hexane, dichloromethane, dichloroethane, etc. and further a supercritical fluid thereof may be used. The supercritical fluid is preferably produced by using carbon dioxide, nitrogen or the like. In the case of using nitrogen, the supercritical fluid is produced at a critical temperature of −149.1° C. and at a critical pressure of 3.4 MPa or more, and in the case of using carbon dioxide, the supercritical fluid is produced at a critical temperature of 31° C. and at a critical pressure of 7.4 MPa or more.

The foamed duct formed by blow molding has an expansion ratio of for example 2.5 or more, and is constituted by an independent bubble structure (having an independent bubble ratio of 70% or more) having a plurality of bubble cells. The present application can effectively form a tube-shaped foamed molded body with a high expansion ratio, and from this point of view, the effect is excellent when the expansion ratio is 3 or more. An average bubble diameter of the bubble cells in the thickness direction is, for example, less than 300 μm, and preferably less than 100 μm.

FIGS. 28 and 29 show a step of connecting a first duct 201 and a second duct 202, wherein an open end 202a of the second duct 202 is inserted into and connected to an inner diameter enlarged portion 201b of an open end 201a of the first duct 201, to make the first duct 201 communicate with the second duct 202. FIG. 28 shows a state before the connection, and FIG. 29 shows a state after the connection.

At the time of the connection, positioning marks for positional alignment are formed on the first duct 201 and the second duct 202 respectively, and these positioning marks are aligned such that the ducts are aligned with each other and connected. Each positioning mark may have at least one inclined line inclined with respect to the insertion direction, but if there is only one inclined line, it is difficult to recognize a slight angular deviation or the like when aligning them, therefore, it is preferable that the positioning mark is formed by combining two or more inclined lines.

In the present embodiment, positioning marks formed by two inclined lines orthogonal to each other are formed on the respective ducts 201 and 202, respectively. That is to say, a positioning mark 210 formed by two inclined lines 211 and 212 orthogonal to each other is formed in a region on the open end 201a side (a side where the open end is located) of the first duct 201, and a positioning mark 220 formed by two inclined lines 221 and 222 orthogonal to each other is formed in a region on the open end 202a side of the first duct 202. Here, the positioning marks 210 and 220 formed on the respective ducts 201 and 202 have the same shape (X shape), and the respective inclined lines 211, 212, 221 and 222 are formed to be inclined at an inclination angle of 45° with respect to the insertion direction respectively.

In the respective ducts 201, 202, the positioning marks 210, 220 are formed at the time of blow molding. For example, an X-shaped groove portion is formed in a metal mold used at the time of blow molding, and then blow molding of the respective ducts 201, 202 is performed. Thus, on the respective ducts 201, 202, the positioning marks 210, 220 are each formed as a ridge portion. The line width and height of each of the positioning marks 210, 220 are arbitrary, but for example, when the ducts 201, 202 are foamed ducts, each of the positioning marks 210, 220 which have excellent visibility and which can be easily aligned can be formed by being formed as a ridge portion having a width of about 0.5 mm to 2 mm (for example, 1 mm) and a height of about 0.5 mm to 2 mm (for example, 1 mm). When the ducts 201, 202 are non-foamed ducts, the positioning marks 210, 220 having excellent visibility can be formed even if the line width and height thereof are smaller than the above-mentioned line width and height, and in this case, for example, each positioning mark may be formed as a ridge portion having a width of about 0.2 mm to 0.5 mm (for example, 0.3 mm) and a height of about 0.2 mm to 0.5 mm (for example, 0.3 mm).

The formation of the positioning mark 210, 220 at the time of blow molding of the respective duct 201, 202 is also advantageous in ensuring a position at which the positioning mark 210, 220 is to be formed. If a groove portion is formed in the metal mold to form the positioning mark 210, 220, the position at which the positioning mark 210, 220 is to be formed in the respective duct 201, 202 is determined by the metal mold. If the molding is performed using the same metal mold, in the molded ducts 201 and 202, there is no inconsistency between in the positions at which the individual positioning marks 210 and 220 are to be formed.

In addition, it may also be contemplated that the positioning mark 210, 220 is formed in a groove shape, but in this case, it is necessary to dispose a ridge portion corresponding to the positioning mark 210, 220 on the metal mold. When contemplating a modification to an existing metal mold or the like, it is necessary to make greater modification to form a ridge portion on the metal mold, and in this respect, it is more advantageous that a groove portion is formed in the metal mold and the positioning mark 210, 220 is formed as a ridge portion. Furthermore, each of the inclined lines 211, 212, 221 and 222 constituting the respective positioning marks 210 and 220 is formed in a line shape, but may also be formed intermittently in a broken line shape, for example.

Furthermore, in the respective duct 201, 202, a mounting hole 213, 223 is formed at an intersection of the two inclined lines 211 and 212 of the positioning mark 210 or an intersection of the two inclined lines 221 and 222 of the positioning mark 220, respectively. These mounting holes 213 and 223 are, for example, holes for allowing a rivet or clip or the like made of resin to be inserted, and these mounting holes 213 and 223 are made coincident with each other and fixed by the rivet or the like. Therefore, when connecting the first duct 201 with the second duct 202, the positions of these mounting holes 213 and 223 are aligned using these positioning marks 210 and 220.

Hereinafter, a method of connecting the first duct 201 with the second duct 202 using the positioning marks 210 and 220 will be described.

Firstly, the first duct 201 and the second duct 202 are molded by blow molding. In the blow molding, since it is necessary to blow air, the molding is performed in a state in which the open ends of the respective ducts are closed. Since the closure portion is retained as a burr, the burrs of the respective ducts 201 and 202 are cut off and the open ends are formed, before the connection.

At this time, the first duct 201 to be externally inserted is cut in such a manner as to traverse the two inclined lines 211 and 212 of the positioning mark 210 formed toward the open end side. End portions 211A and 212A of the inclined lines 211 and 212 formed by the cutting become reference points for positional alignment. The second duct 202 to be internally inserted does not necessarily have to be cut transversely to go across the positioning mark 220, but may also be cut in such a manner as to traverse the two inclined lines 221 and 222 of the positioning mark 220, similarly to the first duct 201.

The cutting position may be inconsistent during the cutting of the first duct 201. If the cutting position is inconsistent, the length of the first duct 201 may be inconsistent. For example, in the case of cutting along a line A-A and in the case of cutting along a line B-B in FIG. 30, the lengths of the cut first duct 201 are different. However, since the position of the mounting hole 213 is determined by the positioning mark 210, the inconsistency in the length of the first duct 201 does not affect the positional alignment.

As shown in FIG. 28, for the first duct 201 and the second duct 202 molded and cut in this manner, an open end 202a of the second duct 202 is inserted into an open end 201a of the first duct 201 provided with an inner diameter enlarged portion 201b. At the time of insertion, the positional alignment is performed in such a manner that the inclined lines 221 and 222 of the positioning mark 220 of the second duct 202 respectively coincide with the end portions 211A and 212A of the inclined lines 211 and 212 of the positioning mark 210 of the first duct 201 (the inclined line 211 coincides with the inclined line 221 and the inclined line 212 coincides with the inclined line 222). That is to say, the positional alignment is performed in such a manner that the X-shaped positioning mark 210 of the first duct 201 completely overlaps with the X-shaped positioning mark 220 of the second duct 202. Visually, such positional alignment is easy, and the first duct 201 and the second duct 202 can be simply aligned with high accuracy, without proficiency.

Thus, in the inserted state shown in FIG. 29, the positions of the mounting hole 213 of the first duct 201 and the mounting hole 223 of the second duct 202 coincide with each other and overlap so as to be in a communication state. In this state, a rivet made of resin, or the like is inserted into the mounting holes 213 and 223, and the first duct 201 and the second duct 202 are fixed with each other.

When the first duct 201 and the second duct 202 are to be connected, it may also be contemplated that the positioning mark is made to be in a cross shape. FIG. 31 shows an example in which a cross-shaped positioning mark is formed on the first duct 201 and the second duct 202. A vertical line 251 in a direction the same as the insertion direction is formed as a positioning mark on the first duct 201, and a vertical line 261 and a horizontal line 262 orthogonal to the insertion direction are formed as a positioning mark on the second duct.

If such a cross-shaped positioning mark is to be used as an alignment mark, for example, alignment in a rotation direction can be performed by making the vertical line 251 coincide with the vertical line 261, but the alignment cannot be performed in the insertion direction.

In the duct connection structure and connection method of the present embodiment, alignment is performed by forming, on the respective ducts 201 and 202, the positioning marks 210 and 220 for alignment having inclined lines inclined with respect to the insertion direction, therefore the alignment can be performed simply and highly-accurately in both the rotation direction and the insertion direction. For example, since the first duct 201 and the second duct 202 are ducts having a circular cross section, a positional deviation easily occurs in the rotation direction at the time of connection, but the alignment enables an alignment not only in the insertion direction but also in the rotation direction.

In addition, in the previous embodiment, in the respective duct 201, 202, a mounting hole 213, 223 is formed at an intersection of the two inclined lines 211 and 212 of the positioning mark 210 or an intersection of the two inclined lines 221 and 222 of the positioning mark 220 respectively, but for example, the mounting hole 213, 223 may be formed at a position other than the intersection. In an example shown in FIG. 32, the mounting hole 213, 223 is formed at a position away from the intersection in the insertion direction. (A) in FIG. 32 shows a state before insertion, and (B) in FIG. 32 shows a state after insertion.

Even if the mounting holes 213 and 223 are formed at a position other than the intersection, the alignment of the mounting holes 213 and 223 can be performed by making the positioning marks 210 and 220 coincide with each other, as long as the positional relationships between the positioning marks 210 and 220 and the mounting holes 213 and 223 are ensured.

FIG. 33 shows a variant example in the case where the positioning marks 210, 220 or the mounting holes 213, 223 are disposed on both front and back surfaces of the respective ducts 201, 202. When the mounting holes 213, 223 are disposed on both front and back surfaces of the respective ducts 201, 202, it is preferable that the front surface and the back surface are recognizable. Therefore, in the present example, as shown in (A) in FIG. 33, for example, a vertical line 214 (224), direction of which coincides with the insertion direction, is added as an auxiliary line to the positioning mark 210, 220 on the front surface side, and as shown in (B) in FIG. 33, two vertical lines 215 and 216 (225 and 226), directions of which coincide with the insertion direction, are added to the positioning marks 210, 220 on the back surface side respectively. Whether it is the front side or the back side can be judged by checking the number of the auxiliary lines.

Furthermore, each of the ducts 201 and 202 is not limited to the form that the cross section is circular, for example, the cross section may be elliptic or quadrate (square or rectangular). Even in the case of using these shapes, it is possible to prevent a positional deviation in the insertion direction and in a direction orthogonal to the insertion direction.

Fifth Embodiment

In the blow molding of a foamed duct, a form in which a foamed resin is extruded at a parting line is employed, and as a result, a portion with a large thickness may be formed in the vicinity of the parting line. FIG. 40 shows a thicker portion 402 formed in the vicinity of a parting line PL in a foamed duct 401 having a circular cross section.

When the foamed duct 401 is to be molded by blow molding, as shown in (A) in FIG. 40, a parison P is supplied between a pair of metal molds 411 and 412, and as shown in (B) in FIG. 40 and (C) in FIG. 40, mold closing is performed, and the parison is shaped by blowing air into the parison. At the time of shaping, the parison P is sandwiched and pinched off between opposite surfaces 411a and 412a of the metal molds 411 and 412, but at this time, the sandwiched parison (molten resin) is in a crushed and extruded form. As a result, as shown in (D) in FIG. 40, the thicker portion 402 is formed by the resin extruded toward the inside of the metal molds 411 and 412.

If the thicker portion 402 as described above is formed, the shape of an inner surface of the foamed duct 401 is not the original circular shape, and there is a problem that poor fitting occurs when it is combined with other ducts or mounted to a register.

In order to eliminate such an unfavorable situation, for example, as shown in FIG. 41, it may be contemplated that the molding is performed by disposing a protrusion portion in such a manner that the parting line PL protrudes outward, but in this case, a groove portion 403 is formed in the inner surface of the duct along the parting line PL, whereby an unfavorable situation in which air leaks therefrom will occur.

An object of the present embodiment is to provide a foamed duct with good fittability which can be easily fitted and mounted to a register or other ducts or the like and which does not cause air leakage, and further, its object is to provide a method of molding the foamed duct.

In order to achieve the preceding objects, the foamed duct of the present embodiment is a foamed duct formed by blow molding of a foamed resin, which is characterized in that at least an opening end is substantially circular, and at least in the vicinity of the opening end, at least an outer circumferential surface in the vicinity of the parting line is a flat surface.

Furthermore, the method of molding a foamed duct of the present embodiment is a method of molding a foamed duct in which a foamed molten resin is sandwiched by a pair of metal molds and blow-molded, which is characterized in that the cross-sectional shape of each of the metal molds is a substantially semicircular shape, and the vicinity of surfaces abutting each other corresponding to the parting line is formed as a flat surface having a linear cross section.

For example, in a cylindrical foamed duct, at least the outer circumferential surface in the vicinity of the parting line is made as a flat surface, so that the molten resin can be gently extruded toward the inside, and a thicker portion can hardly be formed. Furthermore, since the parting line is not retreated, no groove portion is formed in the inner surface of the duct.

According to the present embodiment, it is possible to provide a foamed duct which has excellent fittability, can be easily fitted and mounted to a register or other ducts, etc., and does not cause air leakage.

The foamed duct of the present embodiment is, for example, a foamed duct having a circular cross section, and is a lightweight automotive duct for circulating cold and warm air supplied from an air conditioning unit to a desired location. FIG. 34 shows an example of a form of the foamed duct 301, and register fitting portions 303 and 303 are formed in the form of being branched from a main flow path 302. In the case of the present embodiment, the main flow path 302 and the register fitting portions 303 and 303 are each formed into a cylindrical shape, but the present application can be applied as long as the opening portions of the register fitting portions 303 and 303 have a circular shape, and other parts may not have a cylindrical shape. Furthermore, as described above, the present application is applied in a case where the opening portions of the register fitting portions 303 and 303 have a circular shape, but the circular shape in this case is not limited to a perfect circular shape, and also includes, for example, an elliptical shape.

The foamed duct 301 is molded by, for example, performing mold closing through split molds on a thermoplastic resin mixed with a foaming agent and performing blow molding. The thermoplastic resin or foaming agent used is the same as that in the previous embodiment.

The foamed duct formed by blow molding has an arbitrary expansion ratio, and is constituted by an independent bubble structure (having an independent bubble ratio of 70% or more) having a plurality of bubble cells. The present application is effective in molding of a foamed duct having a high expansion ratio and a certain thickness, and from this point of view, the effect is better in the case where the expansion ratio is 2 to 4, and preferably 2.5 or more (for example, 2.8) and the thickness is 2 mm to 6 mm, and preferably 3 mm or more (for example, 4 mm). An average bubble diameter of the bubble cells in the thickness direction is, for example, less than 300 µm, and preferably less than 100 µm.

In the foamed duct 301 formed by blow molding the foamed resin as described previously, the resin is extruded toward the inner surface side in the vicinity of the parting line, and a thicker portion with a larger thickness is formed in the vicinity of the parting line. If a thicker portion is formed, the shape of the inner surface of the foamed duct may change, which may result in poor fitting. Alternatively, in order to solve this problem, if a projection portion is disposed in such a manner that the parting line protrudes outward, and the parting line is retreated from the circular inner wall surface, a groove portion is formed in the inner surface of the duct along the parting line, and air leakage occurs therefrom.

Therefore, in the foamed duct 301 of the present embodiment, this situation is eliminated by forming a flat surface portion at the outer circumferential surface in the vicinity of the parting line, in the vicinity of at least the opening portions of the register fitting portions 303, 303.

As a form of a portion in the vicinity of the parting line in the vicinity of the opening portion of the register fitting portion 303, for example, as shown in FIGS. 35 and 36, it may be contemplated that the shape of the inner surface is kept circular, and only the outer surface is a flat surface (a linear portion).

If the cross-sectional shape shown in FIGS. 35 and 36 is described, in the present example, the basic shape of the cross section of the register fitting portion 303 is kept circular, and in the vicinity of the parting line PL, the shape is in the form of being linearly enlarged. This is described in detail in FIG. 37.

That is to say, the present example shows following form, in which in the cross-sectional shape of the circular register fitting portion 303, a tangent line with the parting line PL as a tangent point (a tangent line S1 with a point A as a tangent point in the figure) and a tangent line with a point away from the parting line PL as a tangent point (a tangent line S2 with a point B as a tangent point in the figure) are drawn, and a region surrounded by the tangent line S1 and the tangent line S2 (a dashed region in the figure) is enlarged (expanded). Therefore, in the vicinity of the parting line PL, the register fitting portion 303 has a flat surface 331 corresponding to the tangential line S1 and a flat surface 332 corresponding to the tangential line S2 on the outer surface thereof, and a linear portion is constituted by these flat surfaces.

The resin capacity is enlarged in the parting line PL by setting the cross-sectional shape as shown in FIGS. 35 to 37. Specifically, a region indicated by oblique lines of FIG. 37 is enlarged. In the enlarged region, the extruded resin in the vicinity of the parting line PL is absorbed, and the formation of the thicker portion is suppressed.

However, in the form described above, if the size of the flat surface 331 corresponding to the tangent line S1 is too large and become overlarge, the shape of the foamed duct 301 will largely change, and therefore it is preferable that the shape is modified to a minimal extent by which the extruded resin can be absorbed. For example, when a radius R of the foamed duct 1 is 50 mm, it is preferable that a dimension L1 of the flat surface 331 starting from the parting line PL is about 10 mm. A ratio (L1/R) of the radius R to the dimension L1 is preferably 0.05 to 0.4, and more preferably 0.1 to 0.3.

In addition, the shape in the vicinity of the parting line is not limited thereto, and can be modified in various manners.

FIG. 38 shows another example of the cross-sectional shape in the vicinity of the opening portion of the register fitting portion 303. In the foamed duct 301 of the present embodiment, the register fitting portion 303 is molded into a cylindrical shape, and the cross-sectional shape in the vicinity of the opening portion is circular. In the present example, a part of such a circular cross-sectional shape is modified so that the thicker portion or the groove portion is not formed.

Specifically, in the register fitting portion 303 having a circular cross-sectional shape, a portion in the vicinity of the parting line PL is made as a linear portion. In the case of the present embodiment, as shown in FIG. 38, the portion in the vicinity of the parting line PL is made into a straight shape (a linear shape in which each of the inner surface and the outer surface constitutes a linear flat surface). The straight shape portion 333 is formed in such a manner that the straight shape portion is connected to both sides with the parting line PL located therein, and the straight shape portions are formed at the two parting lines PL, respectively.

The length L2 of the straight shape portion 333 starting from the parting line PL can be arbitrarily set, but the shape of the circular cross section changes largely if the length L is too large, which is not preferable. Therefore, it is preferable that the length L is about 3 mm to 20 mm (for example, 10 mm).

If the straight shape portion 333 is formed in the vicinity of at least the opening portion of the register fitting portions 303, 303, the resin extruded at the parting line PL does not form a thicker portion, and the shape of the inner surface can be maintained. Therefore, fitting of a register or the like can be easily performed. Furthermore, with the formation of the straight shape portion 333, a groove portion is not formed in the vicinity of the parting line PL, and there is no fear of air leakage or the like.

The foamed duct 301 described previously is molded by sandwiching a foamed molten resin with a pair of metal molds each having a semicircular cavity, and performing blow molding. At this time, in order to mold the foamed duct 301 having, for example, a cross-sectional shape as shown in FIGS. 35 to 37, it is also possible that a part of a circular arc of the respective metal mold 311, 312 (a portion in the vicinity of the surfaces abutting each other) is made linear as shown in FIG. 39, corresponding to the flat surface 331, 332 in the vicinity of the parting line PL shown in FIG. 37. If flat surfaces 311a and 312a corresponding to the flat surface 331 and flat surfaces 311b and 312b corresponding to the flat surface 332 are formed on the respective metal molds 311 and 312, the shape shown in FIG. 37 can be formed.

In the foamed duct of the present embodiment, since a linear portion is formed along the parting line, the extrusion of the resin toward the inner surface side is mitigated, and a thicker portion protruding toward the inner wall is not formed. As a result, it can be easily fitted to a register or other ducts or the like. Furthermore, since a gap or the like is not formed at the time of fitting, air leakage does not occur.

The invention claimed is:

1. A molded article, comprising a tubular base portion and an opening portion disposed in the tubular base portion,
    wherein the tubular base portion has a base wall, a first side wall, a second side wall and an opposite wall,
    wherein a peripheral edge of the opening portion has a pair of long-side portion opposite to each other and a pair of short-side portions disposed to be connected to the pair of long-side portion, and
    wherein multiple V-groove-shaped first ribs are disposed at edges of the opening portion, along the long-side portion on a side of the first side wall and along the pair of short-side portions.

2. The molded article according to claim 1, wherein a second rib is disposed between a parting line of the molded article and the opening portion.

3. The molded article according to claim 2, wherein when a distance between the parting line of the molded article and the opening portion is set to be L1 and a length of a side wall of the second rib is set to be L2, wherein L2/L1 is 0.5 or more.

4. The molded article according to claim 2, wherein the side wall of the second rib is disposed to be connected to the parting line.

5. The molded article according to claim 2, wherein the second rib is disposed such that a depth of the second rib is increasing along with the second rib being extending away from the opening portion.

6. The molded article according to claim 2, wherein when a depth of a deepest portion of the second rib is set to be D and a thickness of a bottom wall of the second rib is set to be T, wherein D/T is 2 or more.

7. The molded article according to claim 1, wherein the molded article comprises a beam rib disposed along the peripheral edge of the opening portion, and
    the beam rib is disposed between a parting line of the molded article and the opening portion.

8. The molded article according to claim 7, wherein the multiple V-groove-shaped first ribs are disposed to be connected to the beam rib.

9. The molded article according to claim 7, wherein the beam rib is constituted by a groove-shaped concave portion disposed along the peripheral edge.

10. The molded article according to claim 9, wherein the multiple V-groove-shaped first ribs are disposed within the groove-shaped concave portion.

11. The molded article according to claim 2, wherein the second rib is disposed at a center of the long-side portion.

12. The molded article according to claim 1, wherein the molded article is a foamed molded article.

13. A method of manufacturing the molded article according to claim 1, comprising a molded body formation step and a cut-off step,
    wherein in the molded body formation step, a molded body is formed by molding a molten resin, wherein the molded body comprises a tubular base portion, a tubular portion disposed in such a manner as to be erected from the base portion, and the multiple V-groove-shaped first ribs are disposed at the edges of the tubular portion, and a closure portion is disposed at one end of the tubular portion, and
    in the cut-off step, the closure portion is cut off by cutting the tubular portion to form an opening portion.

* * * * *